US012612293B1

(12) United States Patent
Yang et al.

(10) Patent No.: US 12,612,293 B1
(45) Date of Patent: Apr. 28, 2026

(54) METHOD FOR DETERMINING ALIGNMENT STATE, CONTROLLER, AND MATERIAL HANDLING EQUIPMENT

(71) Applicant: VisionNav Robotics USA Inc., Acworth, GA (US)

(72) Inventors: Siqi Yang, Acworth, GA (US); Bingchuan Yang, Acworth, GA (US)

(73) Assignee: VisionNav Robotics USA Inc., Acworth, GA (US)

( * ) Notice: Subject to any disclaimer, the term of this patent is extended or adjusted under 35 U.S.C. 154(b) by 0 days.

(21) Appl. No.: 19/083,800

(22) Filed: Mar. 19, 2025

(30) Foreign Application Priority Data

Jan. 27, 2025 (CN) .......................... 202510127493.3

(51) Int. Cl.
| | |
|---|---|
| *B66F 9/24* | (2006.01) |
| *B66F 9/075* | (2006.01) |
| *G01S 17/86* | (2020.01) |
| *G05D 107/70* | (2024.01) |

(52) U.S. Cl.
CPC .............. *B66F 9/24* (2013.01); *B66F 9/0755* (2013.01); *G01S 17/86* (2020.01); *G05D 2107/70* (2024.01)

(58) Field of Classification Search
None
See application file for complete search history.

(56) References Cited

U.S. PATENT DOCUMENTS

| | | |
|---|---|---|
| 2018/0089616 A1 | 3/2018 | Jacobus et al. |
| 2021/0141368 A1* | 5/2021 | Holwell ........... G05B 19/41895 |

| | | | |
|---|---|---|---|
| 2021/0390331 A1* | 12/2021 | Kellner | .................... G01S 15/66 |
| 2022/0089419 A1* | 3/2022 | Kim | ........................ B66F 9/0755 |
| 2022/0276360 A1* | 9/2022 | Ma | ............................. G06T 7/80 |
| 2022/0375206 A1 | 11/2022 | Onoda | |
| 2023/0128637 A1* | 4/2023 | Kouris | ....................... G06T 7/12 |
| | | | 382/173 |
| 2024/0310851 A1* | 9/2024 | Ebrahimi Afrouzi | ........................ |
| | | | A47L 9/2873 |
| 2024/0428545 A1* | 12/2024 | Venkatachalapathy | ...................... |
| | | | G06V 10/16 |

(Continued)

FOREIGN PATENT DOCUMENTS

| | | |
|---|---|---|
| CN | 112230204 A | 1/2021 |
| CN | 115123839 B | 12/2022 |

(Continued)

*Primary Examiner* — Lail A Kleinman

(74) *Attorney, Agent, or Firm* — Westbridge IP LLC

(57) ABSTRACT

Disclosed are a method for determining an alignment state, a controller, and material handling equipment. A main technical solution includes: acquiring, by using a sensor, images and point clouds; extracting first target image data of a first target region from an image of a first stacking object, and extracting second target image data of a second target region from an image of a second stacking object; extracting, based on the first target image data, first target point cloud data; extracting, based on the second target image data, second target point cloud data; determining a pose of the first stacking object, and determining a pose of the second stacking object; determining a difference between the pose of the first stacking object and the pose of the second stacking object, and comparing the difference with a threshold to determine an alignment state between the first stacking object and the second stacking object.

18 Claims, 11 Drawing Sheets

(56)     References Cited

U.S. PATENT DOCUMENTS

2025/0054238 A1*   2/2025   Lu ........................... G06F 18/00
2025/0218039 A1*   7/2025   Spletzer ................... G06T 7/73

FOREIGN PATENT DOCUMENTS

CN        118135008  A     6/2024
CN        118644532  A     9/2024

* cited by examiner

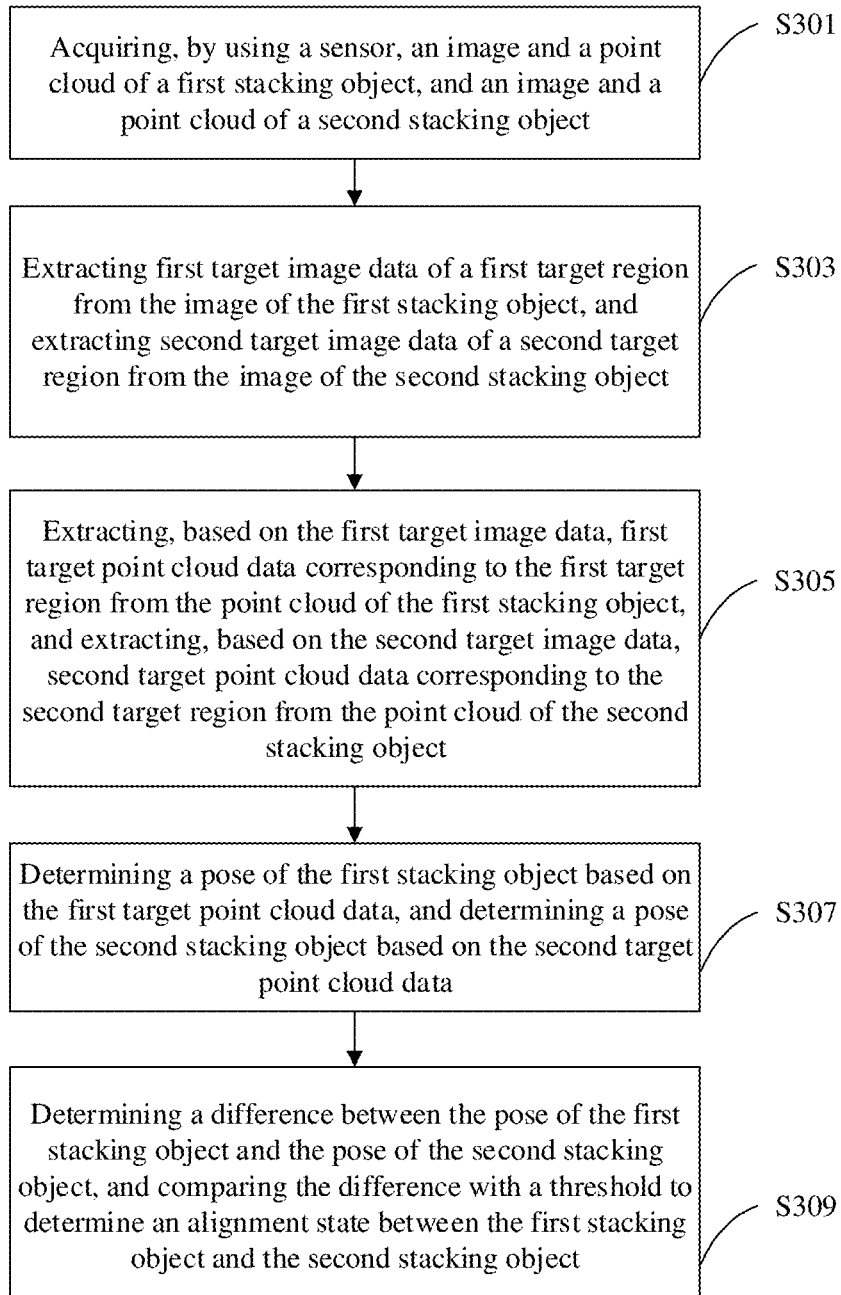

Acquiring, by using a sensor, an image and a point cloud of a first stacking object, and an image and a point cloud of a second stacking object ⟋ S301

Extracting first target image data of a first target region from the image of the first stacking object, and extracting second target image data of a second target region from the image of the second stacking object ⟋ S303

Extracting, based on the first target image data, first target point cloud data corresponding to the first target region from the point cloud of the first stacking object, and extracting, based on the second target image data, second target point cloud data corresponding to the second target region from the point cloud of the second stacking object ⟋ S305

Determining a pose of the first stacking object based on the first target point cloud data, and determining a pose of the second stacking object based on the second target point cloud data ⟋ S307

Determining a difference between the pose of the first stacking object and the pose of the second stacking object, and comparing the difference with a threshold to determine an alignment state between the first stacking object and the second stacking object ⟋ S309

FIG. 3

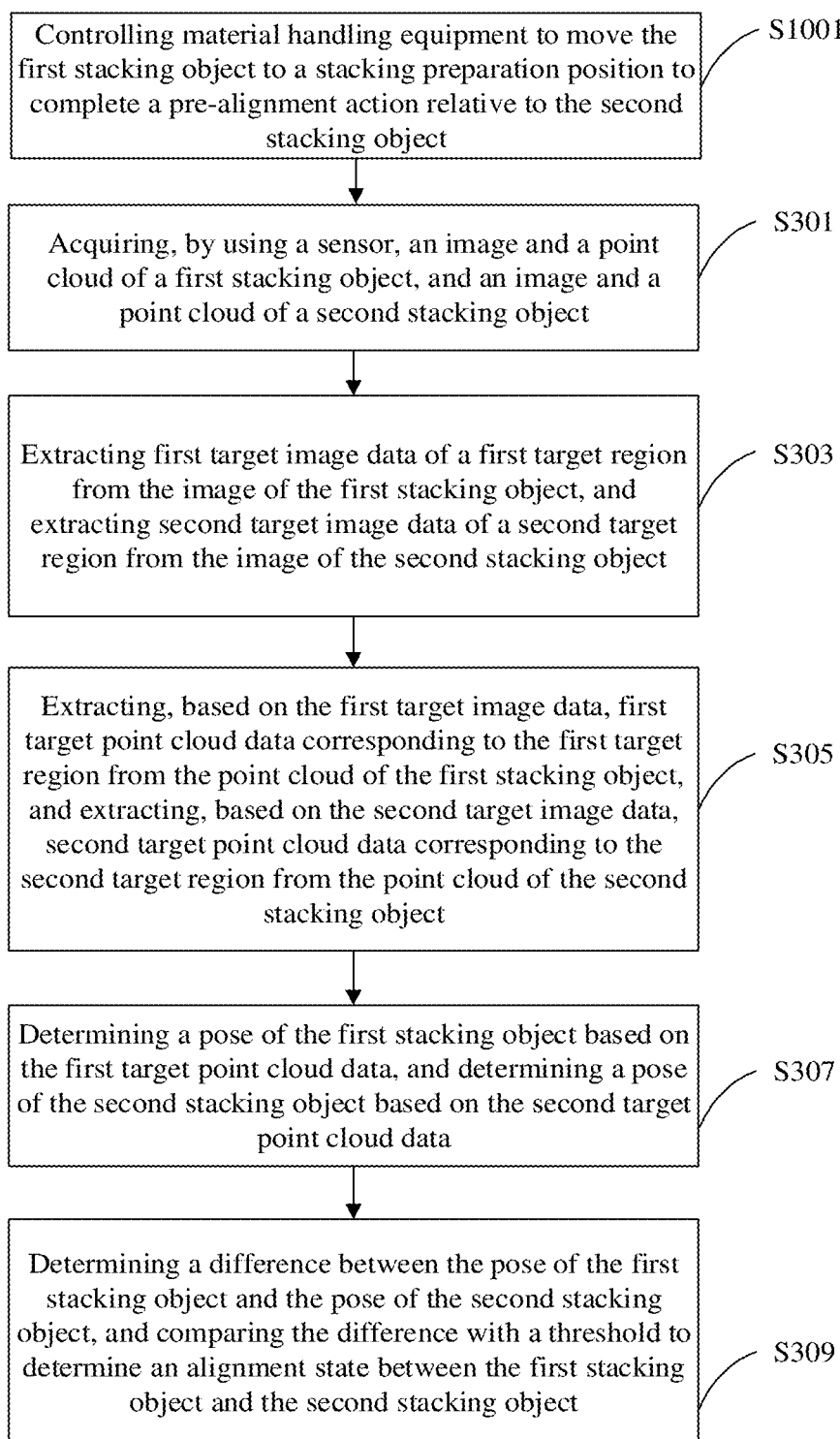

Controlling material handling equipment to move the first stacking object to a stacking preparation position to complete a pre-alignment action relative to the second stacking object — S1001

Acquiring, by using a sensor, an image and a point cloud of a first stacking object, and an image and a point cloud of a second stacking object — S301

Extracting first target image data of a first target region from the image of the first stacking object, and extracting second target image data of a second target region from the image of the second stacking object — S303

Extracting, based on the first target image data, first target point cloud data corresponding to the first target region from the point cloud of the first stacking object, and extracting, based on the second target image data, second target point cloud data corresponding to the second target region from the point cloud of the second stacking object — S305

Determining a pose of the first stacking object based on the first target point cloud data, and determining a pose of the second stacking object based on the second target point cloud data — S307

Determining a difference between the pose of the first stacking object and the pose of the second stacking object, and comparing the difference with a threshold to determine an alignment state between the first stacking object and the second stacking object — S309

FIG. 10

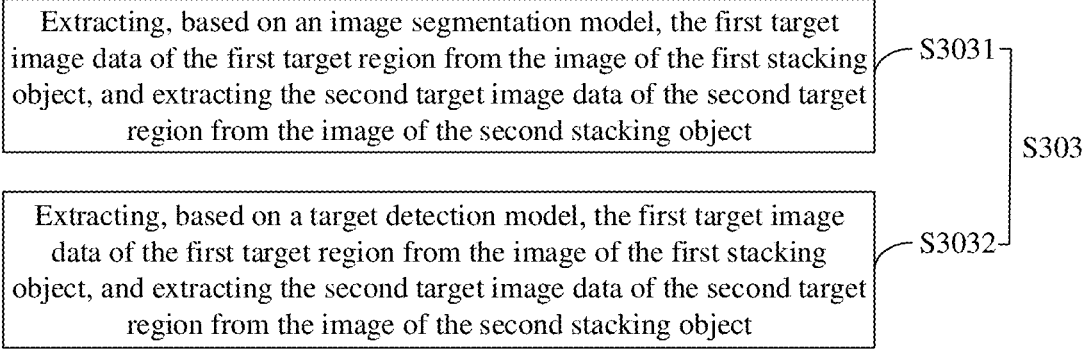

Extracting, based on an image segmentation model, the first target image data of the first target region from the image of the first stacking object, and extracting the second target image data of the second target region from the image of the second stacking object ⌐ S3031 ⌐

Extracting, based on a target detection model, the first target image data of the first target region from the image of the first stacking object, and extracting the second target image data of the second target region from the image of the second stacking object ⌐ S3032 ⌐ S303

FIG. 11

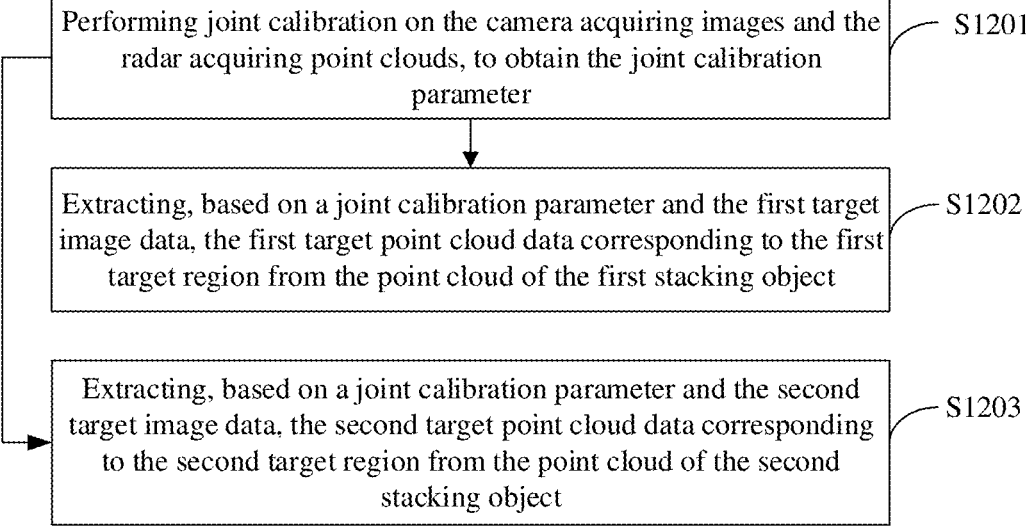

Performing joint calibration on the camera acquiring images and the radar acquiring point clouds, to obtain the joint calibration parameter — S1201

Extracting, based on a joint calibration parameter and the first target image data, the first target point cloud data corresponding to the first target region from the point cloud of the first stacking object — S1202

Extracting, based on a joint calibration parameter and the second target image data, the second target point cloud data corresponding to the second target region from the point cloud of the second stacking object — S1203

FIG. 12

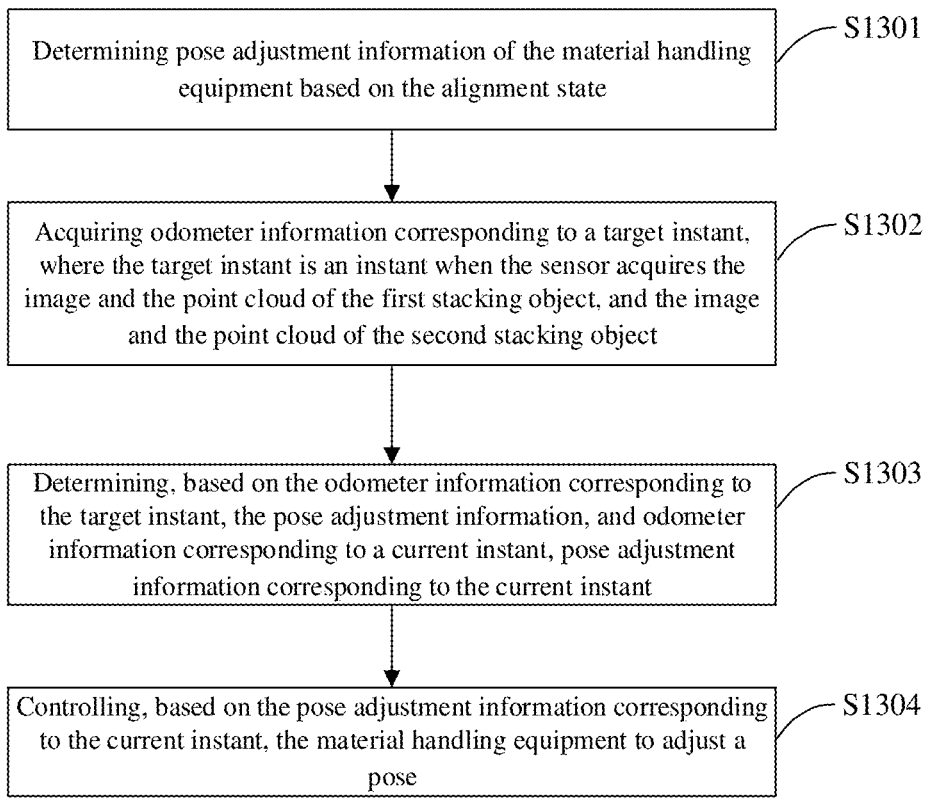

Determining pose adjustment information of the material handling equipment based on the alignment state ⟋ S1301

Acquiring odometer information corresponding to a target instant, where the target instant is an instant when the sensor acquires the image and the point cloud of the first stacking object, and the image and the point cloud of the second stacking object ⟋ S1302

Determining, based on the odometer information corresponding to the target instant, the pose adjustment information, and odometer information corresponding to a current instant, pose adjustment information corresponding to the current instant ⟋ S1303

Controlling, based on the pose adjustment information corresponding to the current instant, the material handling equipment to adjust a pose ⟋ S1304

FIG. 13

METHOD FOR DETERMINING ALIGNMENT STATE, CONTROLLER, AND MATERIAL HANDLING EQUIPMENT

CROSS-REFERENCE TO RELATED APPLICATIONS

This present disclosure claims priority to Chinese Patent Application No. 202510127493.3, filed on Jan. 27, 2025, which is hereby incorporated by reference in its entirety.

TECHNICAL FIELD

The present disclosure relates to the field of warehousing and logistics technology and machine vision, and in particular, to a method for determining an alignment state, a controller, and material handling equipment.

BACKGROUND

A system that uses material handling equipment such as an automated guided vehicle (AGV) during operation has advantages such as being highly unmanned, automated, and intelligent, which improves production efficiency and an operational level in industries such as warehousing, manufacturing, and logistics. In a typical scenario, material handling equipment is often responsible for moving various goods, during which stacking of goods is inevitably involved. The goods are usually packed by using a cardboard box or the like, or stored by using a material cage, a wooden box, a plastic box, or the like.

In consideration of space utilization, stacking objects such as cardboard boxes, material cages, and wooden boxes that are loaded with goods may be stacked in a process of moving the goods by the material handling equipment. In view of stability, the material handling equipment is required to accurately stack one stacking object onto another stacking object. In this process, if the two stacking objects cannot be aligned, operation safety may be affected.

SUMMARY

The present disclosure provides a method for determining an alignment state, a controller, and material handling equipment, to control a first stacking object and a second stacking object to be aligned with each other during stacking.

According to a first aspect, a method for determining an alignment state is provided in an embodiment of the present disclosure. The method includes: acquiring, by using a sensor, an image and a point cloud of a first stacking object, and an image and a point cloud of a second stacking object; extracting first target image data of a first target region from the image of the first stacking object, and extracting second target image data of a second target region from the image of the second stacking object; extracting, based on the first target image data, first target point cloud data corresponding to the first target region from the point cloud of the first stacking object; extracting, based on the second target image data, second target point cloud data corresponding to the second target region from the point cloud of the second stacking object; determining a pose of the first stacking object based on the first target point cloud data, and determining a pose of the second stacking object based on the second target point cloud data; and determining a difference between the pose of the first stacking object and the pose of the second stacking object, and comparing the difference with a threshold to determine an alignment state between the first stacking object and the second stacking object.

Optionally, the method further includes: before determining the alignment state, controlling material handling equipment to move the first stacking object to a stacking preparation position to complete a pre-alignment action relative to the second stacking object.

Optionally, the extracting the first target image data of the first target region from the image of the first stacking object, and extracting the second target image data of the second target region from the image of the second stacking object includes: extracting, based on an image segmentation model, the first target image data of the first target region from the image of the first stacking object, and extracting the second target image data of the second target region from the image of the second stacking object.

Optionally, the extracting the first target image data of the first target region from the image of the first stacking object, and extracting the second target image data of the second target region from the image of the second stacking object includes: extracting, based on a target detection model, the first target image data of the first target region from the image of the first stacking object, and extracting the second target image data of the second target region from the image of the second stacking object.

Optionally, the extracting, based on the first target image data, the first target point cloud data corresponding to the first target region from the point cloud of the first stacking object includes: extracting, based on a joint calibration parameter and the first target image data, the first target point cloud data corresponding to the first target region from the point cloud of the first stacking object; and the extracting, based on the second target image data, the second target point cloud data corresponding to the second target region from the point cloud of the second stacking object includes: extracting, based on a joint calibration parameter and the second target image data, the second target point cloud data corresponding to the second target region from the point cloud of the second stacking object.

Optionally, the method further includes: performing joint calibration on a camera acquiring images and a radar acquiring point clouds, to obtain the joint calibration parameter.

Optionally, the joint calibration parameter includes at least one of following: an intrinsic parameter and an extrinsic parameter of the camera, an extrinsic parameter of the radar relative to the camera, and an extrinsic parameter of the radar relative to material handling equipment.

Optionally, the comparing the difference with the threshold to determine the alignment state between the first stacking object and the second stacking object includes: in a case where the difference is greater than or equal to the threshold, determining the alignment state as misaligned; and in a case where the difference is less than the threshold, determining the alignment state as aligned.

Optionally, the method further includes: when the alignment state is misaligned, controlling material handling equipment to adjust a pose; re-acquiring, by using the sensor, an image and a point cloud of the first stacking object, and an image and a point cloud of the second stacking object; re-determining a difference between a pose of the first stacking object and a pose of the second stacking object; and re-determining the alignment state until the difference is less than the threshold.

Optionally, the method further includes: when the alignment state is aligned, controlling material handling equipment to place the first stacking object onto the second stacking object to complete stacking.

Optionally, the controlling the material handling equipment to adjust the pose includes: controlling the material handling equipment to adjust a pose of a chassis or a pose of a fork.

Optionally, the controlling the material handling equipment to adjust the pose includes: determining pose adjustment information of the material handling equipment based on the alignment state; acquiring odometer information corresponding to a target instant, where the target instant is an instant when the sensor acquires the image and the point cloud of the first stacking object, and the image and the point cloud of the second stacking object; determining, based on the odometer information corresponding to the target instant, the pose adjustment information, and odometer information corresponding to a current instant, pose adjustment information corresponding to the current instant; and controlling, based on the pose adjustment information corresponding to the current instant, the material handling equipment to adjust a pose.

Optionally, the acquiring, by using the sensor, the image and the point cloud of the first stacking object, and the image and the point cloud of the second stacking object includes: acquiring an original image of the first stacking object and an original image of the second stacking object, and acquiring an original point cloud of the first stacking object and an original point cloud of the second stacking object; performing distortion correction on the original image of the first stacking object based on a pre-calibrated camera intrinsic parameter, and performing distortion correction on the original image of the second stacking object based on the pre-calibrated camera intrinsic parameter; transforming the original point clouds from a coordinate system in which the radar is located to a coordinate system in which material handling equipment is located, and performing distortion correction on the original point cloud of the first stacking object, and performing distortion correction on the original point cloud of the second stacking object based on odometer information and time stamps corresponding to the original images; and performing time synchronization between the distortion-corrected images and the distortion-corrected point clouds, to obtain the image and the point cloud of the first stacking object, and the image and the point cloud of the second stacking object.

Optionally, the determining the pose of the first stacking object based on the first target point cloud data includes: extracting a first border point cloud from the first target point cloud data; performing fitting on the first border point cloud based on the least squares method to obtain a border line equation corresponding to the first stacking object; and determining the pose of the first stacking object based on the border line equation corresponding to the first stacking object.

Optionally, the determining the pose of the second stacking object based on the second target point cloud data includes: extracting a second border point cloud from the second target point cloud data; performing fitting on the second border point cloud based on the least squares method to obtain a border line equation corresponding to the second stacking object; and determining the pose of the second stacking object based on the border line equation corresponding to the second stacking object.

Optionally, the first target region is located on a first side of the first stacking object, the second target region is located on a second side of the second stacking object, and the first side and the second side are a same side when the first stacking object is aligned with the second stacking object.

Optionally, the first stacking object is a first material cage, and the second stacking object is a second material cage; the first target region includes at least a partial region of a first foot cup and at least a partial region of a third foot cup of the first material cage; and the second target region includes at least a partial region of a second upright and at least a partial region of a fourth upright of the second material cage.

Optionally, the first target region further includes at least a partial region of a fifth foot cup and at least a partial region of a seventh foot cup of the first material cage; and the second target region further includes at least a partial region of a sixth upright and at least a partial region of an eighth upright of the second material cage.

Optionally, the first stacking object is a first material cage, and the second stacking object is a second material cage; the first target region includes a first border line and a third border line of the first material cage, and the first border line intersects the third border line; and the second target region includes a second border line and a fourth border line of the second material cage, and the second border line intersects the fourth border line.

Optionally, the first target region further includes a fifth border line and a seventh border line of the first material cage, and the fifth border line intersects the seventh border line; and the second target region further includes a sixth border line and an eighth border line of the second material cage, and the sixth border line intersects the eighth border line.

According to a second aspect, a controller is provided in an embodiment of the present disclosure. The controller is configured to execute a program instruction to implement the method according to any implementation in the first aspect.

According to a third aspect, material handling equipment is provided in an embodiment of the present disclosure. The material handling equipment includes a controller, where the controller is configured to execute a program instruction to implement the method according to any implementation in the first aspect.

According to specific embodiments provided in the present disclosure, the present disclosure discloses the following technical effects:

Firstly, according to the present disclosure, first target image data of a first target region is extracted from an image of a first stacking object that is acquired by a sensor, and second target image data of a second target region is extracted from an image of a second stacking object that is acquired by the sensor; further, based on the first target image data, first target point cloud data corresponding to the first target region is extracted from a point cloud of the first stacking object that is acquired by the sensor, and based on the second target image data, second target point cloud data corresponding to the second target region is extracted from a point cloud of the second stacking object that is acquired by the sensor; then, a pose of the first stacking object is determined based on the first target point cloud data, and a pose of the second stacking object is determined based on the second target point cloud data; and finally, a difference between the pose of the first stacking object and the pose of the second stacking object is determined, and the difference is compared with a threshold to determine an alignment state between the first stacking object and the second stacking object. In this manner, a difference between a pose of the first stacking object and a pose of the second stacking object can be detected in a stacking process, and an alignment state between the first stacking object and the second stacking object can be determined based on the difference and the threshold, which may avoid an impact of an external environment (such as an uneven ground) and an error in the material handling equipment, and pose data of the first stacking object and the second stacking object may be accurately calculated, so as to determine the alignment state between the first stacking object and the second stacking object.

Secondly, according to the present disclosure, both the first target region of the first stacking object and the second target region of the second stacking object may be accurately determined from the images based on either of an image segmentation model and a target detection model, thereby improving detection efficiency.

Thirdly, according to the present disclosure, a spatial relationship between a camera and a radar can be established. The spatial relationship is determined based on an intrinsic parameter and an extrinsic parameter of the camera, an extrinsic parameter of the radar relative to the camera, and an extrinsic parameter of the radar relative to material handling equipment. Based on the spatial relationship, the first target point cloud data corresponding to the first target region of the first stacking object and the second target point cloud data corresponding to the second target region of the second stacking object can be accurately determined from target point clouds.

Fourthly, according to the present disclosure, in consideration of time being not synchronized between data collected by a sensor and an odometer mounted on the material handling equipment, to ensure that data processed by a controller is pose adjustment information data corresponding to a current instant, the pose adjustment information corresponding to the current instant is determined based on odometer information corresponding to a target instant, pose adjustment information corresponding to the target instant, and odometer information corresponding to the current instant, so as to ensure that the material handling equipment accurately adjusts its pose based on the pose adjustment information corresponding to the current instant, thereby ensuring precision of alignment between the first stacking object and the second stacking object at the current instant.

Fifthly, according to the present disclosure, based on a pre-calibrated camera intrinsic parameter, distortion correction is performed on original images collected by the camera, original point cloud data collected by the sensor is transformed from a coordinate system in which the radar is located to a coordinate system in which the material handling equipment is located, and distortion correction is performed on original point clouds based on the odometer information and time stamps corresponding to the original images; and finally, time synchronization between the distortion-corrected images and the distortion-corrected point clouds is performed, to obtain distortion-free and time-synchronized point clouds and images.

Sixthly, according to the present disclosure, after extracting a first border point cloud and a second border point cloud respectively from the first target point cloud data corresponding to the first target region of the first stacking object and the second target point cloud data corresponding to the second target region of the second stacking object, fitting on each of the first border point cloud and the second border point cloud by using the least squares method is performed, to obtain a border line equation corresponding to the first stacking object and a border line equation corresponding to the second stacking object. Then, a difference between the pose of the first stacking object and the pose of the second stacking object may be accurately determined by calculations based on the border line equation corresponding to the first stacking object and the border line equation corresponding to the second stacking object.

Lastly, according to the present disclosure, an operation of the material handling equipment is dynamically controlled based on a result of comparison between the difference and the threshold. When the difference is greater than the threshold, the material handling equipment is controlled to adjust a pose, and re-acquire data collected by the sensor mounted on the material handling equipment, so as to re-determine a difference based on the re-collected data, until the difference is less than the threshold. Then, the controller controls the material handling equipment to place the first stacking object onto the second stacking object to complete stacking, so as to form a closed-loop servo detection control process. In the servo detection process, it is unnecessary to stop operation of the material handling equipment, thereby improving stacking efficiency.

Certainly, any invention of the present disclosure does not necessarily need to achieve all the foregoing advantages.

BRIEF DESCRIPTION OF THE DRAWINGS

To describe the technical solutions in the embodiments of the present disclosure or in the conventional technology more clearly, the following briefly describes the accompanying drawings required for describing the embodiments. Apparently, the accompanying drawings in the following description only show some embodiments of the present disclosure, and a person of ordinary skill in the art may still derive other drawings from these accompanying drawings without creative efforts.

FIG. 3 is a flowchart of a method for determining an alignment state according to an embodiment of the present disclosure.

FIG. 10 is a flowchart of a method for determining an alignment state according to an embodiment of the present disclosure.

FIG. 11 is a flowchart of extracting first target image data and second target image data according to an embodiment of the present disclosure.

FIG. 12 is a flowchart of extracting first target point cloud data and second target point cloud data according to an embodiment of the present disclosure.

FIG. 13 is a flowchart of controlling material handling equipment to adjust a pose according to an embodiment of the present disclosure.

DETAILED DESCRIPTION OF THE EMBODIMENTS

The following clearly and completely describes the technical solutions in embodiments of the present disclosure with reference to the accompanying drawings in embodiments of the present disclosure. Apparently, the described embodiments are merely some but not all of embodiments of the present disclosure. All other embodiments obtained by persons of ordinary skill in the art based on the embodiments of the present disclosure shall fall within the protection scope of the present disclosure.

Terms used in the embodiments of the present disclosure are merely intended to describe specific embodiments, but are not intended to limit the present disclosure. The singular forms of "a/an", "said", and "the" used in embodiments of the present disclosure and the appended claims are also intended to include plural forms, unless the context clearly implies otherwise.

It should be understood that, the term "and/or" used in this specification is merely an association relationship that describes associated objects, and represents that there may be three relationships. For example, A and/or B may represent three cases: only A exists, both A and B exist, and only B exists. In addition, the character "/" in this specification generally indicates an "or" relationship between the associated objects. In addition, the term "based on" used in this specification is not limited to being based on an object only. For example, determining B based on A may indicate: determining B based on A only, or determining B partially based on A.

In a related technology, stacking of an upper stacking object is completed based on a pose of a lower stacking object relative to material handling equipment, without considering an impact of factors such as an inaccurate pickup pose of the upper stacking object, an uneven ground, a cumulative error in an odometer, and an error in the material handling equipment, which leads to misalignment of the upper stacking object during stacking and affects operation safety.

Figure 1:
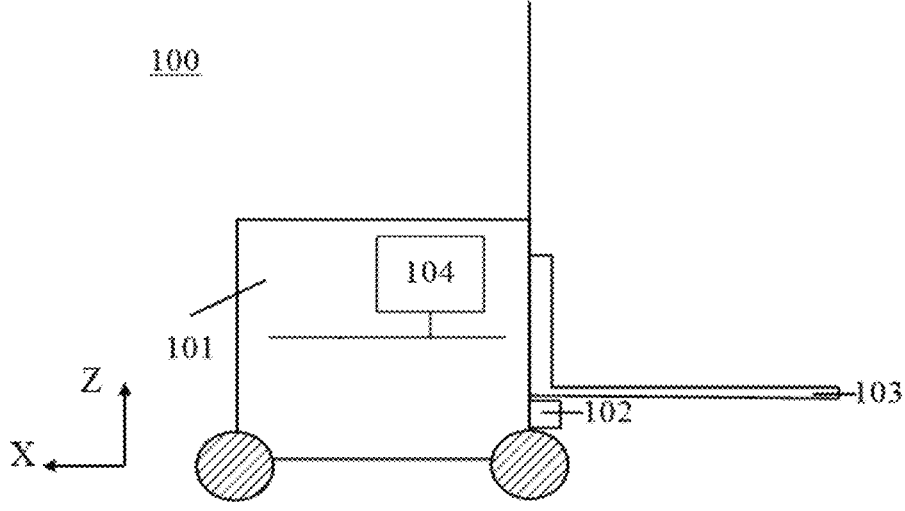
FIG. 1 is a schematic diagram of a system of material handling equipment to which embodiments of the present disclosure are applicable.

In view of this, the present disclosure provides a new idea. In order to facilitate understanding of the present disclosure, the following first describes a schematic diagram of a system of material handling equipment on which the present disclosure is based. FIG. 1 is a schematic diagram of a system of an exemplary material handling equipment to which embodiments of the present disclosure are applicable. As shown in FIG. 1, material handling equipment 100 includes a material handling equipment body 101, a sensor 102, a stacking execution component 103 and a controller 104. For example, the controller 104 may include a memory and a processor. The memory is configured to store a program instruction, and the controller is configured to execute the program instruction to implement the method of the embodiments of the present disclosure.

The material handling equipment 100 involved in embodiments of the present disclosure may be an automated guided forklift, a pallet truck, a crane truck, an AGV (Automated Guided Vehicle, automated guided vehicle), an AMR (Automatic Mobile Robot), a humanoid robot, or the like. The stacking execution component 103 may be a fork, a robotic arm, or the like.

The controller 104 is configured to control the stacking execution component 103 of the material handling equipment 100 to stack a first stacking object and a second stacking object. The controller 104 may be a system or device that performs computation or control functions, such as a control mainboard, a control box, a control unit, a vehicle-mounted computer, a computing platform, a tablet computer, or a computer on the material handling equipment body 101, or a system or device that performs computation or control functions in a local server or cloud server, or a handheld controller or remote controller, or in other forms, which is not limited in embodiments of the present disclosure.

The sensor 102 may be in the form of a sensor module, which includes at least a radar configured to collect point cloud data, such as a Lidar, and/or a visual sensor configured to collect image data, such as a camera.

The controller 104 is configured to store data collected by the sensor 102, for example, point cloud data and image data.

Concepts of nouns involved in embodiments of the present disclosure are first described.

Processor: It is responsible for executing core functions such as calculation, control and decision-making. It may receive data from a sensor, run control algorithms, and command an actuator to complete a task. Common processor types may include: a central processing unit (CPU), a digital signal processor (DSP), a microcontroller unit (MCU), and so on. The processor in the specification may refer to a collection of processors for performing the same or different tasks.

Memory: It is configured to store data or a program. A memory in the specification may be referred to as a collection of memories for performing the same or different tasks.

Controller: At the hardware level, the controller generally includes a processor and a memory. Optionally, the controller may also include input and output interfaces, a mainboard, peripheral circuits and elements. At the software level, the controller generally includes a control algorithm, an operating system, a communication protocol, and so on. A controller in the specification may be referred to as a collection of controllers for performing the same or different tasks.

Mobile robot: It refers to a robot that can move autonomously or under control in an environment. Common types include an automated guided vehicle (AGV), an autonomous mobile robot (AMR), a humanoid robot, and the like, and also include other types such as a robotic vacuum cleaner.

Material handling equipment: It refers to a device that may automatically or semi-automatically perform a handling task. Common forms of the material handling equipment include a forklift, an automated guided vehicle (AGV), an autonomous mobile robot (AMR), a humanoid robot, a robotic arm, and the like.

Automated guided forklift (AGF): It is an intelligent industrial vehicle that integrates a forklift technology and an automated guided vehicle (AGV) technology. It can automatically complete tasks such as material handling and stacking.

Stacking refers to arranging and piling up some objects vertically according to a specific rule.

Stacking object refers to an object involved in stacking, and specifically may be goods itself or goods with a simple package such as a wrapping film, or may be a container that can hold and carry goods, for example, a wooden box, a plastic box, or a pallet.

Stacking process refers to a process in which material handling equipment lifts a first stacking object to make the first stacking object move close to a second stacking object, and then adjusts a pose of the material handling equipment to align the first stacking object with the second stacking object, and thus places the first stacking object on the second stacking object, so as to complete stacking.

The first stacking object refers to a stacking object located above another. The second stacking object refers to a stacking object located below.

Alignment state means a state in which two or more stacking objects are arranged in a vertical direction, and at least part of border lines of a stacking object are parallel to or overlapped with another stacking object. The vertical direction refers to a Z-axis direction (a Z-axis in FIG. 1 and FIG. 2) in a coordinate system of material handling equipment.

Figure 2:
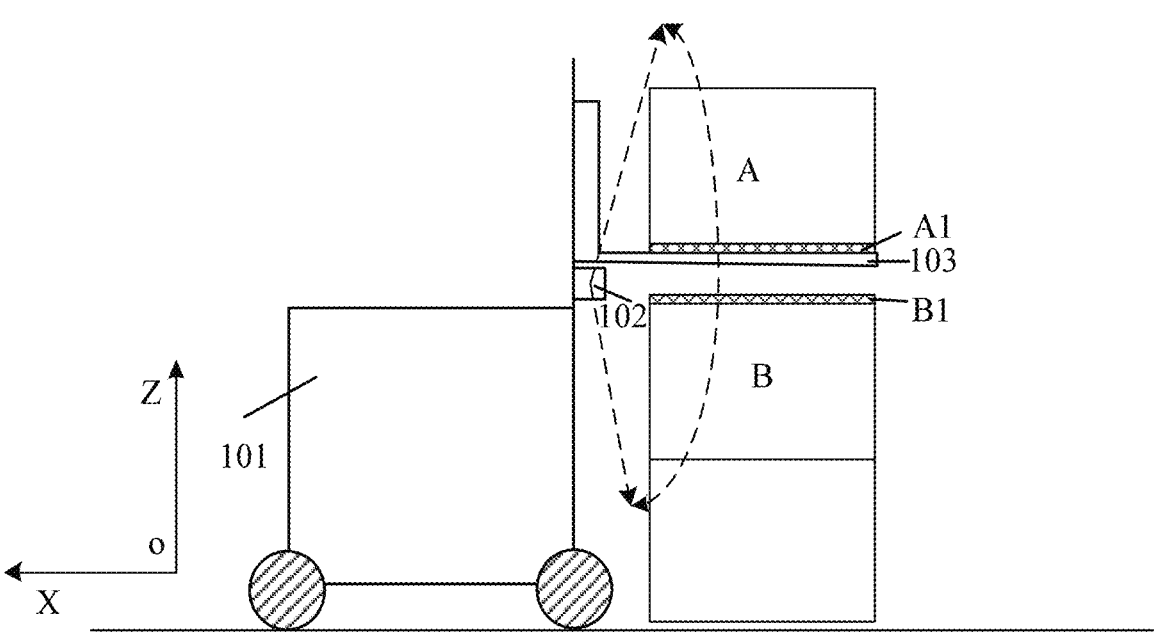
FIG. 2 is a schematic diagram of an application scenario according to an embodiment of the present disclosure.

As shown in FIG. 2, the coordinate system may be defined with a geometric center of the material handling equipment as an origin O. A forward-backward travel direction of the material handling equipment (i.e., a longitudinal direction of the material handling equipment body 101) is defined as an X-axis, with a positive direction of the X-axis being a direction away from an attachment (such as a fork) of the material handling equipment. A height direction of the material handling equipment is defined as a Z-axis. A lateral direction of the material handling equipment body 101 is defined as a Y-axis, with a positive direction of the Y-axis being perpendicular to the page, pointing outwards (not shown in FIG. 2).

A first stacking object has a first target region. The first target region refers to a key structural region, in contact with a second stacking object, of the first stacking object after stacking. For example, the first target region includes at least a key structural region such as a foot cup, or a border line.

A second stacking object has a second target region. The second target region refers to a key structural region, in contact with the first stacking object, of the second stacking object after stacking. For example, the second target region includes at least a key structural region such as an upright, or a border line.

First target image data refers to image data of the first target region that is extracted by a sensor from an image of the first stacking object. The first target image data may be used to extract first target point cloud data corresponding to the first target region from a point cloud of the first stacking object.

Second target image data refers to image data of the second target region that is extracted by the sensor from an image of the second stacking object. The second target image data may be used to extract second target point cloud data corresponding to the second target region from a point cloud of the second stacking object.

First target point cloud data refers to point cloud data of the first target region of the first stacking object that is acquired by the sensor. The first target point cloud data may be used to calculate a pose, an alignment state, and the like of the first stacking object.

Second target point cloud data refers to point cloud data of the second target region of the second stacking object that is acquired by the sensor. The second target point cloud data may be used to calculate a pose, an alignment state, and the like of the second stacking object.

FIG. 3 is a flowchart of a method for determining an alignment state according to an embodiment of the present disclosure. The method may be performed by the material handling equipment in the system architecture shown in FIG. 1. As shown in FIG. 3, the method may include the following steps:

Step S301: acquiring an image and a point cloud of a first stacking object, and an image and a point cloud of a second stacking object;

Step S303: extracting first target image data of a first target region from the image of the first stacking object, and extracting second target image data of a second target region from the image of the second stacking object;

Step S305: extracting, based on the first target image data, first target point cloud data corresponding to the first target region from the point cloud of the first stacking object; and extracting, based on the second target image data, second target point cloud data corresponding to the second target region from the point cloud of the second stacking object;

Step S307: determining a pose of the first stacking object based on the first target point cloud data, and determining a pose of the second stacking object based on the second target point cloud data; and Step S309: determining a difference between the pose of the first stacking object and the pose of the second stacking object, and comparing the difference with a threshold to determine an alignment state between the first stacking object and the second stacking object.

It may be learned from the foregoing process that, according to the present disclosure, a difference between a pose of the first stacking object and a pose of the second stacking object can be detected in a stacking process, and an alignment state between the first stacking object and the second stacking object can be determined based on the difference and the threshold, which may avoid an impact of an external environment (such as an uneven ground) and an error in the material handling equipment, and pose data of the first stacking object and the second stacking object may be accurately calculated, so as to determine the alignment state between the first stacking object and the second stacking object.

The following describes in detail steps in the foregoing procedure and effects that can be further generated with reference to embodiments. It should be noted that limitations related to "first", "second", and the like in the present disclosure do not have limitations in terms of size, order, quantity, and the like, and are merely used for distinguishing in name. For example, the "first stacking object" and the "second stacking object" are used to distinguish between two stacking objects.

First, the "acquiring, by using the sensor, the image and the point cloud of the first stacking object, and the image and the point cloud of the second stacking object" in Step S301 is described in detail with reference to embodiments.

A stacking scenario involved in embodiments of the present disclosure is first briefly introduced. As shown in FIG. 2, when the material handling equipment receives a handling task of stacking a first stacking object A onto a second stacking object B, the controller (for example, a controller 104 shown in FIG. 1) controls a fork of the material handling equipment to pick up the first stacking object A, and then controls the material handling equipment to move to a position near the second stacking object B. By controlling a pose of the material handling equipment, the controller aligns a first target region A1 of the first stacking object A with a second target region B1 of the second stacking object B in a vertical direction, and then stacks the first stacking object A onto the second stacking object B.

In embodiments of the present disclosure, depending on different models of sensors, a plurality of cameras and radars may be installed to simultaneously shoot and scan the first stacking object and the second stacking object.

An odometer estimates a distance of the material handling equipment traveled by measuring its motion, and usually calculates, in combination with sensor data, physical quantities such as a position, a velocity, and an orientation of the material handling equipment.

The sensor involved in embodiments of the present disclosure may include a radar module and a camera (Camera) module. The radar module may include one or more radars, while the camera module may include one or more cameras. The sensor may be installed at a position a preset distance below a midpoint between root parts of the stacking execution component (such as a fork) of the material handling equipment, so that fields of view of both the radar module and the camera module can cover the first target region of the first stacking object and the second target region of the second stacking object. Therefore, the sensor may acquire images including the first stacking object and the second stacking object, and acquire point clouds including the first stacking object and the second stacking object. Optionally, the radar is a Lidar (Lidar). The Lidar may include a 3D Lidar.

The odometer may be disposed at a position near a wheel of the material handling equipment to record a quantity of rotations of the wheel, thereby estimating a distance traveled. Alternatively, the odometer may be disposed at the center of a chassis of the material handling equipment.

For example, the camera, the radar, and the odometer described above may all be controlled by the controller (the controller 104 shown in FIG. 1) built in the material handling equipment, for example, may be controlled by using an System-on-a-Chip, system-on-a-chip (SoC), which is not specifically limited in embodiments of the present disclosure.

Before pose adjustment information of the material handling equipment is determined, it is necessary to synchronize the odometer and the sensor in terms of time. The synchronization may be achieved using a common synchronization method (such as a hardware synchronization method, or a software synchronization method (such as time stamp alignment or interpolation synchronization)). The radar may be synchronized using Pulse Per Second, pulse per second (PPS)+Global Positioning System Recommended Minimum Navigation Information (GPRMC), while the camera may be synchronized using Precision Time Protocol, precision time protocol (PTP) or hardware-triggered synchronization. In addition, the radar and the camera are required to be jointly calibrated in advance to obtain intrinsic parameters of the camera, extrinsic parameters of the camera and the radar, and extrinsic parameters of the radar relative to the material handling equipment.

In embodiments of the present disclosure, when the material handling equipment lifts the first stacking object, and the sensor simultaneously shoots and scans both the first stacking object and the second stacking object, the image and the point cloud of the first stacking object and the image and the point cloud of the second stacking object are acquired by using the sensor. Specifically, when the material handling equipment is controlled to move the first stacking object to a stacking operation position and the material handling equipment is controlled to lift the first stacking object, the radar scans the first stacking object and the second stacking object to acquire the point clouds of the first stacking object and the second stacking object, while the camera simultaneously shoots the first stacking object and the second stacking object to acquire the images of the first stacking object and the second stacking object.

The stacking operation position may refer to a position where the sensor on the material handling equipment can simultaneously acquire target images and target point clouds of both the first stacking object and the second stacking object. Within this area, a fork of the material handling equipment can stack the first stacking object and the second stacking object within a variable pose range of the fork. For example, based on a position of the second stacking object (for example, a stacking object below), a position within a preset distance range in front of the second stacking object serves as the stacking operation position.

Considering distortions in the images and the point clouds collected when the camera shoots and the radar scans the first stacking object and the second stacking object simultaneously, in embodiments of the present disclosure, acquiring the data collected by the sensor mounted on the material handling equipment may further include: acquiring, by the camera, an original image of the first stacking object and an original image of the second stacking object, and acquiring, by the radar, an original point cloud of the first stacking object and an original point cloud of the second stacking object; performing distortion correction on the original images based on a pre-calibrated camera intrinsic parameter; transforming the original point clouds from a coordinate system in which the radar is located to a coordinate system in which the material handling equipment is located, and performing distortion correction on the original point clouds based on odometer information and time stamps corresponding to the original images; and performing time synchronization between the distortion-corrected images and the distortion-corrected point clouds, to obtain the images and the point clouds that are time-synchronized.

The time stamps corresponding to the original images may be a time stamp at which the camera captures the original image (that is, the original image of the first stacking object or the original image of the second stacking object). Camera intrinsic parameters, also referred to as camera internal parameters or inherent parameters, are parameters that describe internal attributes of a camera. These parameters include a focal length, coordinates of a principal point (optical center), and distortion coefficients (for example, k1, k2, k3 for radial distortion, and p1 and p2 for tangential distortion). The intrinsic parameters are typically determined during camera calibration.

Image distortion is mainly caused by optical characteristics of a camera lens. When light passes through the lens, due to refraction and manufacturing limitations, radial distortion and tangential distortion may occur. The radial distortion causes straight lines in an image to appear curved, with the distortion increased as a pixel is far away from the center of the image. The tangential distortion is generated because the lens and a photosensitive element are not completely parallel. Therefore, distortion correction is performed on the original images based on the pre-calibrated camera intrinsic parameter, to obtain the distortion-corrected images.

A distortion in the original point cloud refers to a shape distortion caused by movement of the radar or external factors. The odometer information contains motion information of the radar while collecting the original point cloud. These information generally include a position, a speed, acceleration, and the like. Next, a compensation transformation matrix is determined based on the time stamp of the image and the odometer information. The compensation transformation matrix is then applied to the original point cloud to obtain the distortion-corrected point cloud.

According to the present disclosure, distortion correction is performed, based on a pre-calibrated camera intrinsic parameter, on original images collected by the camera, original point cloud data collected by the sensor is transformed from a coordinate system in which the radar is located to a coordinate system in which the material handling equipment is located, and distortion correction is performed on the original point clouds based on the odometer information and time stamp corresponding to the original images; and finally, time synchronization is performed between the distortion-corrected images and the distortion-corrected point clouds, to obtain distortion-free and time-synchronized images and point clouds.

It should be noted that the embodiments of the present disclosure may be applied to a scenario of a plurality of stacking objects.

The "extracting the first target image data of the first target region from the image of the first stacking object, and extracting the second target image data of the second target region from the image of the second stacking object" in Step S303 is described in detail below with reference to embodiments.

In embodiments of the present disclosure, extracting the first target image data of the first target region from the image of the first stacking object, and extracting the second target image data of the second target region from the image of the second stacking object, generally involve technologies such as image segmentation, target detection, or object recognition. The first target region of the first stacking object in the image typically has a boundary that separates the first stacking object from other parts in the image. The first target region describes a shape, a size, a position, and possible texture or color features of the first stacking object. The second target region of the second stacking object in the image typically has a boundary that separates the second stacking object from other parts in the image. The second target region describes a shape, a size, a position, and possible texture or color features of the second stacking object.

As shown in FIG. 11, in an example, Step S303 includes Step S3031: extracting, based on an image segmentation model, the first target image data of the first target region from the image of the first stacking object, and extracting the second target image data of the second target region from the image of the second stacking object. Image segmentation refers to a process of partitioning an image into a plurality of non-overlapping regions, with each region corresponding to an object in the image. Image segmentation methods may include thresholding, edge detection, region growing, clustering, deep learning, and other methods.

Continuing to refer to FIG. 11, in another example, Step S303 includes Step S3032: extracting, based on a target detection model, the first target image data of the first target region from the image of the first stacking object, and extracting the second target image data of the second target region from the image of the second stacking object. Target detection refers to a process of identifying and locating a specific target or object in the image. Target detection methods are mainly implemented based on a deep learning model.

According to the embodiments of the present disclosure, the image segmentation method or the target detection method may be used to accurately determine the first target region of the first stacking object and the second target region of the second stacking object in the image.

In a process of target detection or image segmentation, a binary mask (or referred to as a mask) with a same size as the image is generally generated. Each pixel value in the mask indicates whether the pixel belongs to the first stacking object/the second stacking object (generally, 1 indicates Yes, and 0 indicates No). The mask may be used to extract the first target region of the first stacking object and the second target region of the second stacking object.

Figure 5:
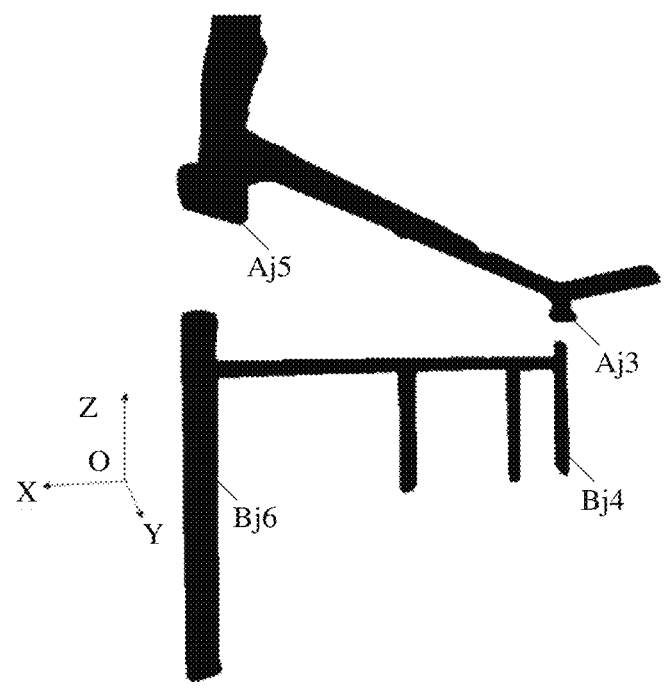
FIG. 5 is a schematic diagram of a segmented image according to an embodiment of the present disclosure.

For example, the camera module captures an image including the first stacking object and the second stacking object. After image segmentation, a segmentation result may be shown in FIG. 5, in which a first part is at least a partial region of a fifth foot cup Aj5 and at least a partial region of a third foot cup Aj3 of the first stacking object, and a second part is at least a partial region of a sixth upright Bj6 and at least a partial region of a fourth upright Bj4 of the second stacking object.

At least a partial region of the foot cup of the first stacking object and at least a partial region of the upright of the second stacking object to be presented in the collected image may be changed by adjusting a quantity of cameras in the camera module and an orientation of the cameras.

The foot cup refers to a supporting component installed at the bottom of a material cage, typically used to stabilize the material cage, bear a weight, and protect the cage from being in direct contact with the ground. In industrial, warehousing, and logistics scenarios, a material cage (also referred to as a returnable cage or warehouse cage) is often equipped with foot cups to achieve better mobility, stackability, and durability.

The upright refers to a vertical supporting structure around the material cage, typically used to bear a weight of the material cage, fix a frame structure of the cage body, and provide stacking functionality. The upright is one of core components of the material cage, and the design of the upright directly affects the strength, stability, and functional performance of the material cage.

In embodiments of the present disclosure, the first target region includes at least a key structural regions such as a foot cup or a border line of the first stacking object. The second target region includes at least a key structural region such as an upright or a border line of the second stacking object.

In an example, the first target region includes at least a partial region of at least one foot cup, and at least a partial region of a foot cup may be a region corresponding to all or part of the foot cup. The second target region includes at least a partial region of at least one upright, and at least a partial region of an upright may be a region corresponding to all or part of the upright.

For example, the first stacking object is a first material cage, and the second stacking object is a second material cage. The first target region includes at least a partial region of a first foot cup and at least a partial region of a third foot cup of the first material cage. The second target region includes at least a partial region of a second upright and at least a partial region of a fourth upright of the second material cage.

For example, the first target region further includes at least a partial region of a fifth foot cup and at least a partial region of a seventh foot cup of the first material cage; and the second target region further includes at least a partial region of a sixth upright and at least a partial region of an eighth upright of the second material cage. The following is described with reference to FIG. 4, FIG. 6, and FIG. 7 separately.

Figure 4:
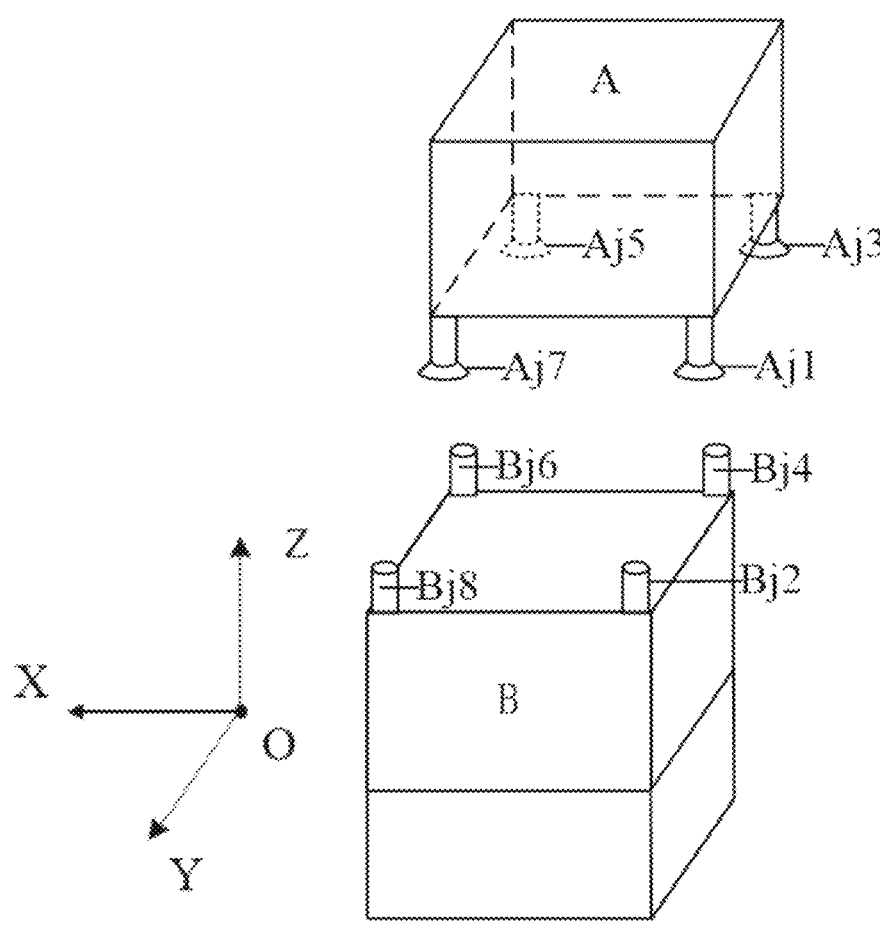
FIG. 4 is a schematic diagram of foot cups and uprights according to an embodiment of the present disclosure.

In FIG. 4, a first target region includes at least a partial region of a first foot cup Aj1, at least a partial region of a third foot cup Aj3, at least a partial region of a fifth foot cup Aj5, and at least a partial region of a seventh foot cup Aj7; and a second target region includes at least a partial region of a second upright Bj2, at least a partial region of a fourth upright Bj4, at least a partial region of a sixth upright Bj6, and at least a partial region of an eighth upright Bj8.

Figure 6:
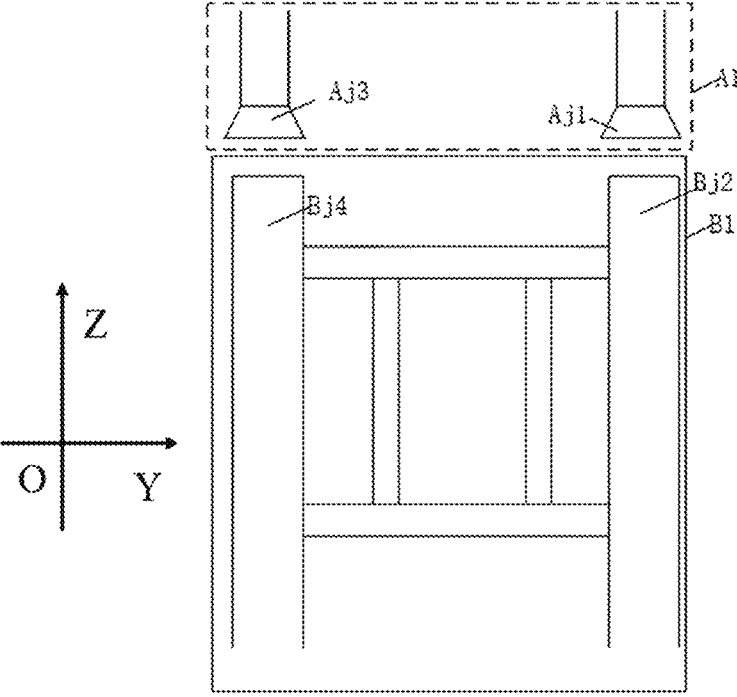
FIG. 6 is a schematic diagram 1 of a first target region and a second target region according to an embodiment of the present disclosure.

In FIG. 6, a first target region A1 includes at least a partial region of a first foot cup Aj1 and at least a partial region of a third foot cup Aj3; and a second target region B1 includes at least a partial region of a second upright Bj2 and at least a partial region of a fourth upright Bj4.

Figure 7:
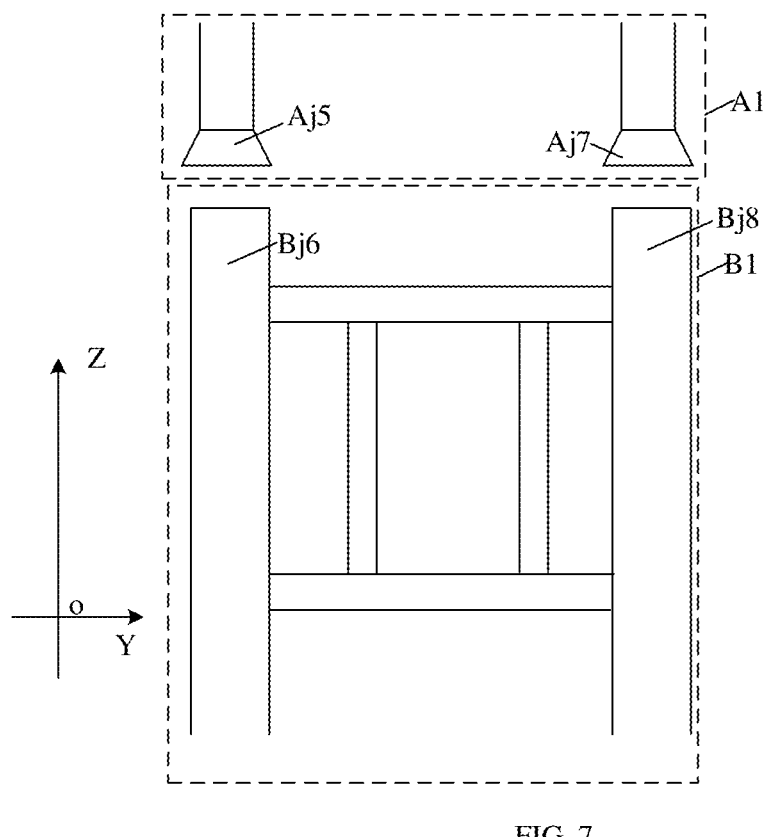
FIG. 7 is a schematic diagram 2 of a first target region and a second target region according to an embodiment of the present disclosure.

In FIG. 7, a first target region A1 includes at least a partial region of a fifth foot cup Aj5 and at least a partial region of a seventh foot cup Aj7; and a second target region B1 includes at least a partial region of a sixth upright Bj6 and at least a partial region of an eighth upright Bj8.

In an example, the first target region includes at least one border line of the first stacking object; and the second target region includes at least one border line of the second stacking object.

For example, the first stacking object is a first material cage, and the second stacking object is a second material cage. The first target region includes a first border line and a third border line of the first material cage, where the first border line intersects the third border line. The second target region includes a second border line and a fourth border line of the second material cage, where the second border line intersects the fourth border line.

For example, the first target region further includes a fifth border line and a seventh border line of the first material cage, where the fifth border line intersects the seventh border line. The second target region further includes a sixth border line and an eighth border line of the second material cage, where the sixth border line intersects the eighth border line. The following is described with reference to FIG. 8.

Figure 8:
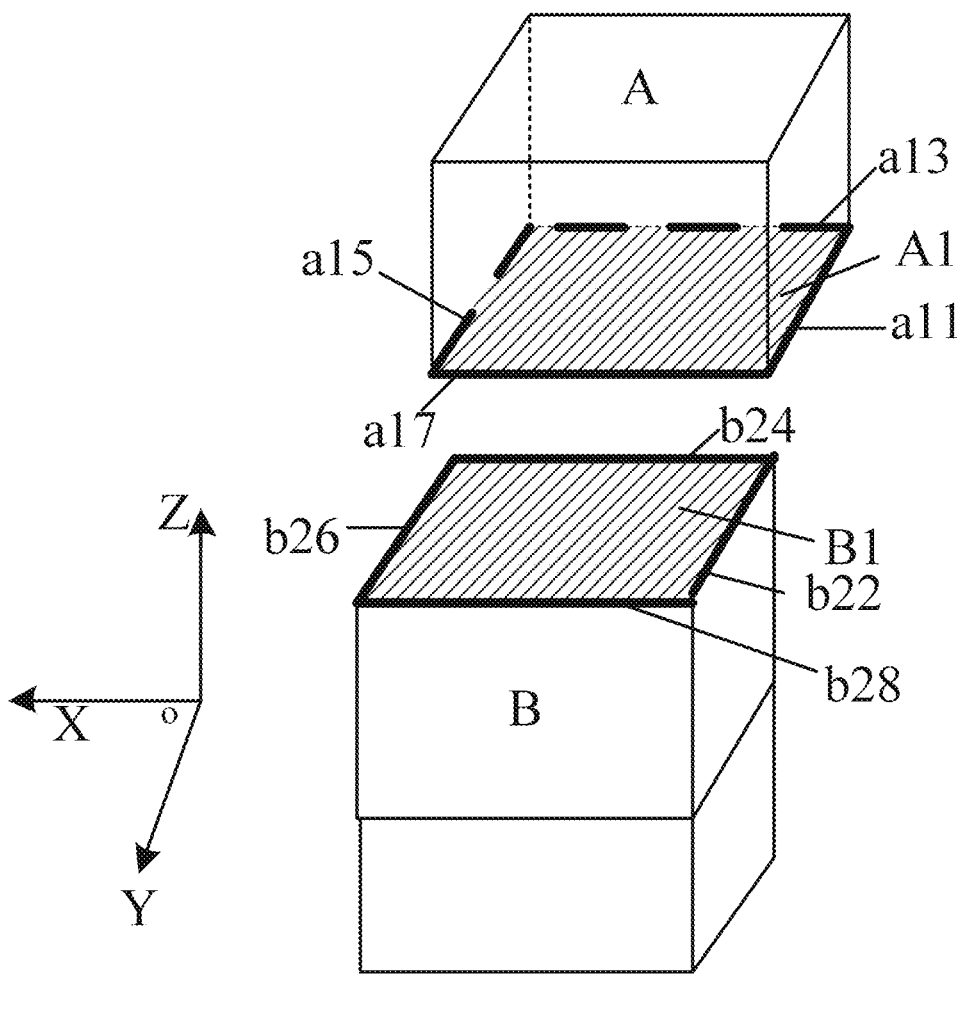
FIG. 8 is a schematic diagram of border lines according to an embodiment of the present disclosure.

In FIG. 8, a first target region A1 includes a first border line a11, a third border line a13, a fifth border line a15, and a seventh border line a17. The first border line a11 intersects the third border line a13, the third border line a13 intersects the fifth border line a15, the fifth border line a15 intersects the seventh border line a17, and the seventh border line a17 intersects the first border line a11.

A second target region B1 includes a second border line b22, a fourth border line b24, a sixth border line b26, and an eighth border line b28. The second border line b22 intersects the fourth border line b24, the fourth border line b24 intersects the sixth border line b26, the sixth border line b26 intersects the eighth border line b28, and the eighth border line b28 intersects the second border line b22.

In FIG. 8, in embodiments of the present disclosure, the first target region A1 is located at the bottom of the first stacking object A, and the second target region B1 is located at the top of the second stacking object B.

The "extracting, based on the first target image data, the first target point cloud data corresponding to the first target region from the point cloud of the first stacking object; and extracting, based on the second target image data, the second target point cloud data corresponding to the second target region from the point cloud of the second stacking object" in Step S305 is described in detail below with reference to embodiments.

In embodiments of the present disclosure, a correspondence between a point cloud and a pixel of an image may be pre-established, and based on the correspondence and the first target region of the first stacking object and the second target region of the second stacking object, the first target point cloud data corresponding to the first target region of the first stacking object is extracted from the point cloud of the first stacking object, and the second target point cloud data corresponding to the second target region of the second stacking object is extracted from the point cloud of the second stacking object.

In embodiments of the present disclosure, before the extracting, based on the first target image data, the first target point cloud data corresponding to the first target region from the point cloud of the first stacking object; and extracting, based on the second target image data, the second target point cloud data corresponding to the second target region from the point cloud of the second stacking object, the method further includes: calibrating the camera and the radar.

As for an example, as shown in FIG. 12, after the camera and the radar are calibrated, the extracting, based on the first target image data, the first target point cloud data corresponding to the first target region from the point cloud of the first stacking object includes Step S1202: extracting, based on a joint calibration parameter and the first target image data, the first target point cloud data corresponding to the first target region from the point cloud of the first stacking object.

Continuing to refer to FIG. 12, the extracting, based on the second target image data, the second target point cloud data corresponding to the second target region from the point cloud of the second stacking object includes Step S1203: extracting, based on a joint calibration parameter and the second target image data, the second target point cloud data corresponding to the second target region from the point cloud of the second stacking object.

Continuing to refer to FIG. 12, in an example, the method further includes Step S1201: performing joint calibration on the camera acquiring images and the radar acquiring point clouds, to obtain the joint calibration parameter.

In an example, the joint calibration parameter includes at least one of the following: an intrinsic parameter and an extrinsic parameter of the camera, an extrinsic parameter of the radar relative to the camera, and an extrinsic parameter of the radar relative to material handling equipment.

Intrinsic parameters (Intrinsic Parameters) of the camera are parameters that describe internal attributes of the camera. These parameters are generally determined when the camera is calibrated, and are generally unchanged during usage of the camera. The intrinsic parameters mainly include the following aspects: a focal length (Focal Length), a principal point (Optical Center), a distortion coefficient (Distortion Coefficients), an intrinsic matrix (Intrinsic Matrix), and the like.

Extrinsic parameters of the camera are parameters that describe a position and an orientation of the camera in a world coordinate system. The extrinsic parameters mainly include the following aspects: a rotation matrix (Rotation Matrix), a translation vector (Translation Vector), and the like.

Different from the intrinsic parameters of the camera, the extrinsic parameters of the camera change as a position of camera in the world coordinate system changes or a shooting instant changes. For example, in stereo vision, if there are two cameras, when the cameras move, their relative position and orientation change, which leads to a change in the extrinsic parameters.

The extrinsic parameter of the radar relative to the camera refers to determining a rotational and translational relationship between the radar and the camera, so that their coordinate systems can be aligned.

The extrinsic parameter of the radar relative to the material handling equipment refers to determining a relative position and direction relationship between the radar and the material handling equipment (whose body is used as a reference coordinate system, such as the foregoing 3D coordinate system). This calibration is a key step to ensure that radar data can be accurately transformed into the 3D coordinate system, thereby achieving precise environmental perception, positioning, navigation, and obstacle avoidance functions.

When the joint calibration parameter includes the intrinsic parameter and extrinsic parameter of the camera, the extrinsic parameter of the radar relative to the camera, and the extrinsic parameter of the radar relative to the material handling equipment, the correspondence between the point cloud and the pixel may be represented by the following formula:

$$P_{img} = T_{img} \cdot T_{camera\text{-}img} \cdot T_{lidar\text{-}camera} \cdot T_{material\ handling\ equipment\text{-}lidar} \cdot P_n$$

Coordinates of a point in the point cloud in the coordinate system in which the material handling equipment is located are denoted as $P_n$, coordinates of a pixel in the image (with an image format being, for example, .img) are denoted as $P_{img}$, the intrinsic parameter of the camera is denoted as $T_{img}$, the extrinsic parameter of the camera is denoted as $T_{camera\text{-}img}$, the extrinsic parameter of the radar relative to the camera is denoted as $T_{lidar\text{-}camera}$, and the extrinsic parameter of the material handling equipment relative to the Lidar is denoted as T material handling equipment-lidar.

According to the embodiments of the present disclosure, joint calibration is performed in advance on the camera that acquires images and the radar that acquires point clouds, so that a spatial relationship between the camera and the radar can be established. The spatial relationship is determined based on the intrinsic parameter and the extrinsic parameter of the camera, the extrinsic parameter of the radar relative to the camera, and the extrinsic parameter of the radar relative to the material handling equipment. Then, based on the spatial relationship and the first target image data, the first target point cloud data corresponding to the first target region can be accurately extracted from the point cloud of the first stacking object, and the second target point cloud data corresponding to the second target region can be accurately extracted from the point cloud of the second stacking object.

The "determining the pose of the first stacking object based on the first target point cloud data, and determining the pose of the second stacking object based on the second target point cloud data" in Step S307 is described below in detail with reference to embodiments.

Figure 14:
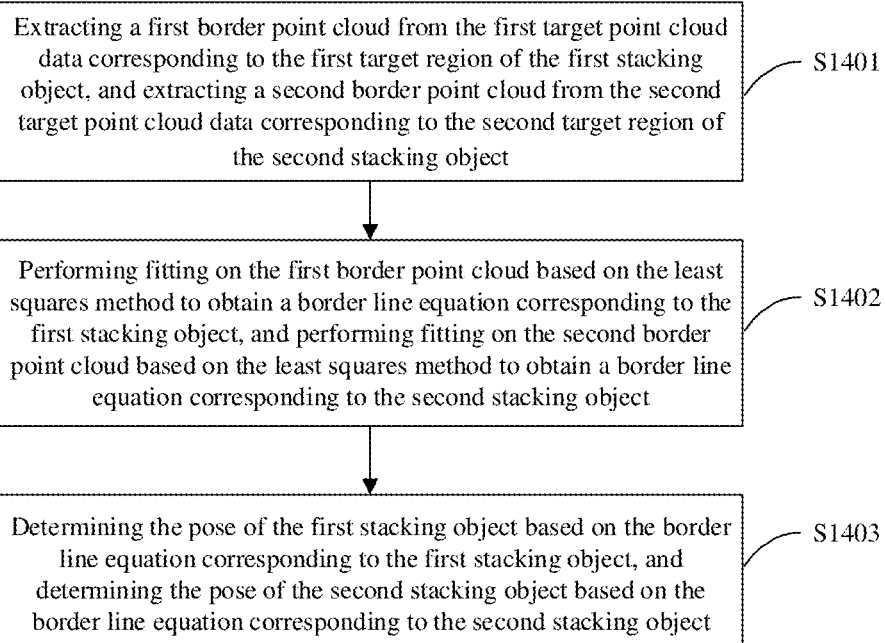
FIG. 14 is a flowchart of determining a pose of a first stacking object and a pose of a second stacking object according to an embodiment of the present disclosure.

As shown in FIG. 14, embodiments of the present disclosure include the following steps.

Step S1401: extracting a first border point cloud from the first target point cloud data corresponding to the first target region of the first stacking object, and extracting a second border point cloud from the second target point cloud data corresponding to the second target region of the second stacking object.

Step S1402: performing fitting on the first border point cloud based on the least squares method to obtain a border line equation corresponding to the first stacking object, and performing fitting on the second border point cloud based on the least squares method to obtain a border line equation corresponding to the second stacking object.

Step S1403: determining the pose of the first stacking object based on the border line equation corresponding to the first stacking object, and determining the pose of the second stacking object based on the border line equation corresponding to the second stacking object.

In an example, based on RANSAC (Random Sample Consensus, random sample consensus) or PROSAC (Progressive Sample Consensus, progressive sample consensus), the first border point cloud is extracted from the first target point cloud data corresponding to the first target region of the first stacking object, and based on RANSAC, the second border point cloud is extracted from the second target point cloud data corresponding to the second target region of the second stacking object. Fitting is performed on the first border point cloud based on the least squares method to obtain the border line equation corresponding to the first stacking object, and fitting is performed on the second border point cloud based on the least squares method to obtain the border line equation corresponding to the second stacking object. The pose of the first stacking object is determined based on the border line equation corresponding to the first stacking object, and the pose of the second stacking object is determined based on the border line equation corresponding to the second stacking object.

The extracting, based on RANSAC, the first border point cloud from the first target point cloud data corresponding to the first target region of the first stacking object may include: (1) randomly selecting a set of points from the first target point cloud data corresponding to the first target region of the first stacking object as an initial sample; (2) estimating parameters of a model (that is, a model for extracting a border point cloud) by using the initial sample, where the parameters include vertices, edge lengths, angles, and other parameters of borders of the first stacking object; (3) classifying, based on the parameters of the model, remaining points in the first target point cloud data corresponding to the first target region of the first stacking object as inliers (points that fit the parameters of the model) and outliers (points that do not fit the parameters of the model); (4) repeating the foregoing steps of random sampling, model estimation, and classification of inliers and outliers, and recording a quantity of inliers of a current model for each iteration; and (5) selecting, among all iterations, a model with a maximum quantity of inliers as a final estimation result (i.e., the border point cloud of the first stacking object).

A process of extracting, based on RANSAC or PROSAC, the second border point cloud from the second target point cloud data corresponding to the second target region of the second stacking object is similar to the process of extracting, based on RANSAC or PROSAC, the first border point cloud from the first target point cloud data corresponding to the first target region of the first stacking object, and details are not described herein again.

Next, the performing fitting on the first border point cloud based on the least squares method to obtain the border line equation corresponding to the first stacking object, and performing fitting on the second border point cloud based on the least squares method to obtain the border line equation corresponding to the second stacking object may include: (1) selecting suitable fitting models depending on shapes of the first stacking object and the second stacking object, where a linear fitting model may be used for the border line equations of the first stacking object and the second stacking object; (2) determining parameters of a first fitting model corresponding to the first stacking object and parameters of a second fitting model corresponding to the second stacking object, such as slope and intercept; (3) constructing a first objective function (i.e., an error function) based on the first fitting model and the first border point cloud; and constructing a second objective function based on the parameters of the second fitting model and the second border point cloud, where the objective function corresponding to the first stacking object represents a deviation or distance between the corresponding fitting model and the first border point cloud, and the objective function corresponding to the second stacking object represents a deviation or distance between the corresponding fitting model and the second border point cloud; (4) solving for, by using the least squares method, model parameters that minimize each of the first objective function and the second objective function, where based on the least squares method, a best fitting is found by minimizing a sum of squares of distances from all point clouds of a first border line to the first fitting model, or a best fitting is found by minimizing a sum of squares of distances from all point clouds of a second border line to the second fitting model; and (5) solving for a minimum value of the first objective function to obtain the border line equation corresponding to the first stacking object; and solving for a minimum value of the second objective function to obtain the border line equation corresponding to the second stacking object.

For example, in embodiments of the present disclosure, distribution of border point clouds directly reflects a shape of a corresponding stacking object. For example, a point cloud with six rectangular faces may be generated for a cubic stacking object.

According to the shape (e.g., a rectangular shape) of the first stacking object, a first border point cloud, a third border point cloud, a fifth border point cloud, and a seventh border point cloud are distributed on respective rectangular faces of the first stacking object. According to the shape of the second stacking object, a second border point cloud, a fourth border point cloud, a sixth border point cloud, and an eighth border point cloud are distributed on respective rectangular faces of the second stacking object.

Fitting is performed, by using the least squares method, on the first border point cloud distributed on the corresponding rectangular face, to obtain a first border line equation. Fitting is performed, by using the least squares method, on the third border point cloud distributed on the corresponding rectangular face, to obtain a third border line equation. Fitting is performed, by using the least squares method, on the fifth border point cloud distributed on the corresponding rectangular face, to obtain a fifth border line equation. Fitting is performed, by using the least squares method, on the seventh border point cloud distributed on the corresponding rectangular face, to obtain a seventh border line equation.

Fitting is performed, by using the least squares method, on the second border point cloud distributed on the corresponding rectangular face, to obtain a second border line equation. Fitting is performed, by using the least squares method, on the fourth border point cloud distributed on the corresponding rectangular face, to obtain a fourth border line equation. Fitting is performed, by using the least squares method, on the sixth border point cloud distributed on the corresponding rectangular face, to obtain a sixth border line equation. Fitting is performed, by using the least squares method, on the eighth border point cloud distributed on the corresponding rectangular face, to obtain an eighth border line equation.

The performing, by using the least squares method, fitting on the third border point cloud distributed on the rectangular face, to obtain the third border line equation is described below by using the third border point cloud as an example.

For example, a border line equation $y=mx+b$ is found on the rectangular face, where m represents a slope, and b represents an intercept, such that the border line equation most closely approximates the third border point cloud distributed on the rectangular face. The goal of the least squares method is to find values of m and b that minimize a sum of squares of vertical distances (i.e., errors) from all points (i.e., all points in the third border point cloud distributed on the rectangular face) to the border line equation. The third border line equation is obtained by minimizing the sum of squares of the vertical distances (i.e., errors) from all the points to the border line equation.

Edge lines of the other border point clouds may be determined using a same method as that applied to the third border point cloud.

In some embodiments, for determining the pose of the first stacking object based on the border line equation corresponding to the first stacking object, and determining the pose of the second stacking object based on the border line equation corresponding to the second stacking object, the following steps may be used: The first stacking object is used as an example. The border line equation corresponding to the first stacking object that is obtained by using a linear fitting algorithm may include four border line equations, which are a first border line equation corresponding to a first border line a11, a third border line equation corresponding to a third border line a13, a fifth border line equation corresponding to a fifth border line a15, and a seventh border line equation corresponding to a seventh border line a17, respectively.

Position information of the first stacking object is determined based on coordinates of any intersection point between straight lines corresponding to the four border line equations. For example, the position information of the first stacking object is determined based on coordinates of an intersection point between the first border line a11 corresponding to the first border line equation and the third border line a13 corresponding to the third border line equation.

Alternatively, a centerline equation is obtained based on two parallel straight lines, and then position information of the first stacking object is determined based on coordinates of an intersection point between a straight line corresponding to the centerline equation and a straight line corresponding to another border line equation. For example, a first centerline is obtained based on the first border line a11 corresponding to the first border line equation and the fifth border line a15 corresponding to the fifth border line equation, and then position information of the first stacking object is determined based on coordinates of an intersection point between the first centerline and the third border line a13 corresponding to the third border line equation.

Then, angle information of the first stacking object is determined based on an angle of any one of straight lines of the first border line a11 corresponding to the first border line equation, the third border line a13 corresponding to the third border line equation, the fifth border line a15 corresponding to the fifth border line equation, and the seventh border line a17 corresponding to the seventh border line equation, and then the pose of the first stacking object is determined based on the position information and the angle information.

A similar step may be used to determine the pose of the second stacking object by using the border line equation corresponding to the second stacking object.

The "determining the difference between the pose of the first stacking object and the pose of the second stacking object, and comparing the difference with the threshold to determine the alignment state between the first stacking object and the second stacking object" in Step S309 is described below in detail with reference to embodiments.

In embodiments of the present disclosure, the alignment state between the first stacking object and the second stacking object may be determined in the following manner: in a case where the difference is greater than or equal to the threshold, determining the alignment state as misaligned; and in a case where the difference is less than the threshold, determining the alignment state as aligned.

In embodiments of the present disclosure, when the difference is greater than or equal to the threshold, it is determined that the alignment state between the first stacking object and the second stacking object is misaligned, and a larger difference between the difference and the threshold indicates a lower degree of alignment between the first stacking object and the second stacking object. When the difference is less than the threshold, it is determined that the alignment state between the first stacking object and the second stacking object is aligned, and a smaller difference between the difference and the threshold indicates a higher degree of alignment between the first stacking object and the second stacking object.

Determination of the threshold may be flexibly adjusted depending on different material handling equipments and stacking objects, for example, may be: −3 cm<X-axis coordinate difference <3 cm, −3 cm<Y-axis coordinate difference <3 cm, and −2°<Z-axis rotation angle difference <2°.

In an example, in embodiments of the present disclosure, when the difference is greater than or equal to the threshold, the method further includes: controlling material handling equipment to adjust a pose; re-acquiring, by using the sensor, an image and a point cloud of the first stacking object, and an image and a point cloud of the second stacking object; re-determining a difference between a pose of the first stacking object and a pose of the second stacking object; and re-determining the alignment state until the difference is less than the threshold.

In an example, in embodiments of the present disclosure, when the difference is less than the threshold, the method further includes: controlling, by the controller, material handling equipment to place the first stacking object onto the second stacking object to complete stacking.

In some embodiments, in embodiments of the present disclosure, the first target region is located at the bottom (that is, a first side) of the first stacking object, the second target region is located at the top (for example, a second side) of the second stacking object, and the first side and the second side are a same side when the first stacking object is aligned with the second stacking object. The following is described in detail with reference to FIG. 4, FIG. 6, FIG. 7, and FIG. 8 separately.

As shown in FIG. 4, in some embodiments, the first target region is located at the bottom of the first stacking object A. The first target region includes at least a partial region of the first foot cup Aj1, at least a partial region of the third foot cup Aj3, at least a partial region of the fifth foot cup Aj5, and at least a partial region of the seventh foot cup Aj7. The second target region is located at the top of the second stacking object B. The second target region includes at least a partial region of the second upright Bj2, at least a partial region of the fourth upright Bj4, at least a partial region of the sixth upright Bj6, and at least a partial region of the eighth upright Bj8. When it is determined that the alignment state is aligned, the first target region and the second target region are arranged in a vertical direction, the first foot cup Aj1 is aligned with the second upright Bj2, the third foot cup Aj3 is aligned with the fourth upright Bj4, the fifth foot cup Aj5 is aligned with the sixth upright Bj6, and the seventh foot cup Aj7 is aligned with the eighth upright Bj8.

As shown in FIG. 6, in some embodiments, the first target region A1 includes at least a partial region of the first foot cup Aj1 and at least a partial region of the third foot cup Aj3. The second target region B1 includes at least a partial region of the second upright Bj2 and at least a partial region of the fourth upright Bj4. In a Z-axis direction, when it is determined that the alignment state is aligned, the first foot cup Aj1 is aligned with the second upright Bj2, and the third foot cup Aj3 is aligned with the fourth upright Bj4.

As shown in FIG. 7, in some embodiments, the first target region A1 includes at least a partial region of the fifth foot cup Aj5 and at least a partial region of the seventh foot cup Aj7. The second target region B1 includes at least a partial region of the sixth upright Bj6 and at least a partial region of the eighth upright Bj8. In the Z-axis direction, when it is determined that the alignment state is aligned, the fifth foot cup Aj5 is aligned with the sixth upright Bj6, and the seventh foot cup Aj7 is aligned with the eighth upright Bj8.

As shown in FIG. 8, in some embodiments, the first target region A1 is located at the bottom (that is, a first side) of the first stacking object A. The first target region A1 includes the first border line a11, the third border line a13, the fifth border line a15, and the seventh border line a17. The second target region B1 is located at the top (that is, a second side) of the second stacking object B. The second target region B1 includes the second border line b22, the fourth border line b24, the sixth border line b26, and the eighth border line b28. When it is determined that the alignment state is aligned, the first target region A1 and the second target region B1 are arranged in a vertical direction, the first border line a11 is parallel to the second border line b22, the third border line a13 is parallel to the fourth border line b24, the fifth border line a15 is parallel to the sixth border line b26, and the seventh border line a17 is parallel to the eighth border line b28.

In embodiments of the present disclosure, the controlling the material handling equipment to adjust the pose may include: controlling the material handling equipment to adjust a pose of the first stacking object on a fork and/or a pose of a chassis of the material handling equipment (that is, adjusting a pose of the material handling equipment relative to the second stacking object).

As shown in FIG. 13, in an example, the controlling the material handling equipment to adjust the pose includes:

Step S1301: determining pose adjustment information of the material handling equipment based on the alignment state;

Step S1302: acquiring odometer information corresponding to a target instant, where the target instant is an instant when the sensor acquires the image and the point cloud of the first stacking object, and the image and the point cloud of the second stacking object;

Step S1303: determining, based on the odometer information corresponding to the target instant, the pose adjustment information, and odometer information corresponding to a current instant, pose adjustment information corresponding to the current instant; and Step S1304: controlling, based on the pose adjustment information corresponding to the current instant, the material handling equipment to adjust a pose.

The pose adjustment information may refer to information for adjusting a position and an orientation (i.e., an angle) of the material handling equipment. The current instant is different from the target instant, and the target instant is generally a historical instant relative to the current instant.

For example, the pose adjustment information corresponding to the current instant may be determined according to the following formula:

$$E_n{}^{\wedge}=H_{n+1}{}^{-1}\cdot H_n\cdot E_n$$

$H_n$ denotes the odometer information corresponding to the target instant, $E_n$ denotes the pose adjustment information corresponding to the target instant, $H_{n+1}{}^{-1}$ denotes the odometer information corresponding to the current instant, and $E_n{}^{\wedge}$ denotes the pose adjustment information corresponding to the current instant.

According to embodiments of the present disclosure, in consideration of a problem of time being not synchronized between data obtained after being processed by the controller and data collected by the sensor and the odometer mounted on the material handling equipment, to ensure that the data obtained after being processed by the controller is pose adjustment information corresponding to a current instant, the pose adjustment information corresponding to the current instant is determined based on odometer information corresponding to a target instant, pose adjustment information corresponding to the target instant, and odometer information corresponding to the current instant, so as to ensure that the material handling equipment accurately adjusts its pose based on the pose adjustment information corresponding to the current instant, thereby ensuring precision of alignment between the first stacking object and the second stacking object at the current instant.

Figure 9:
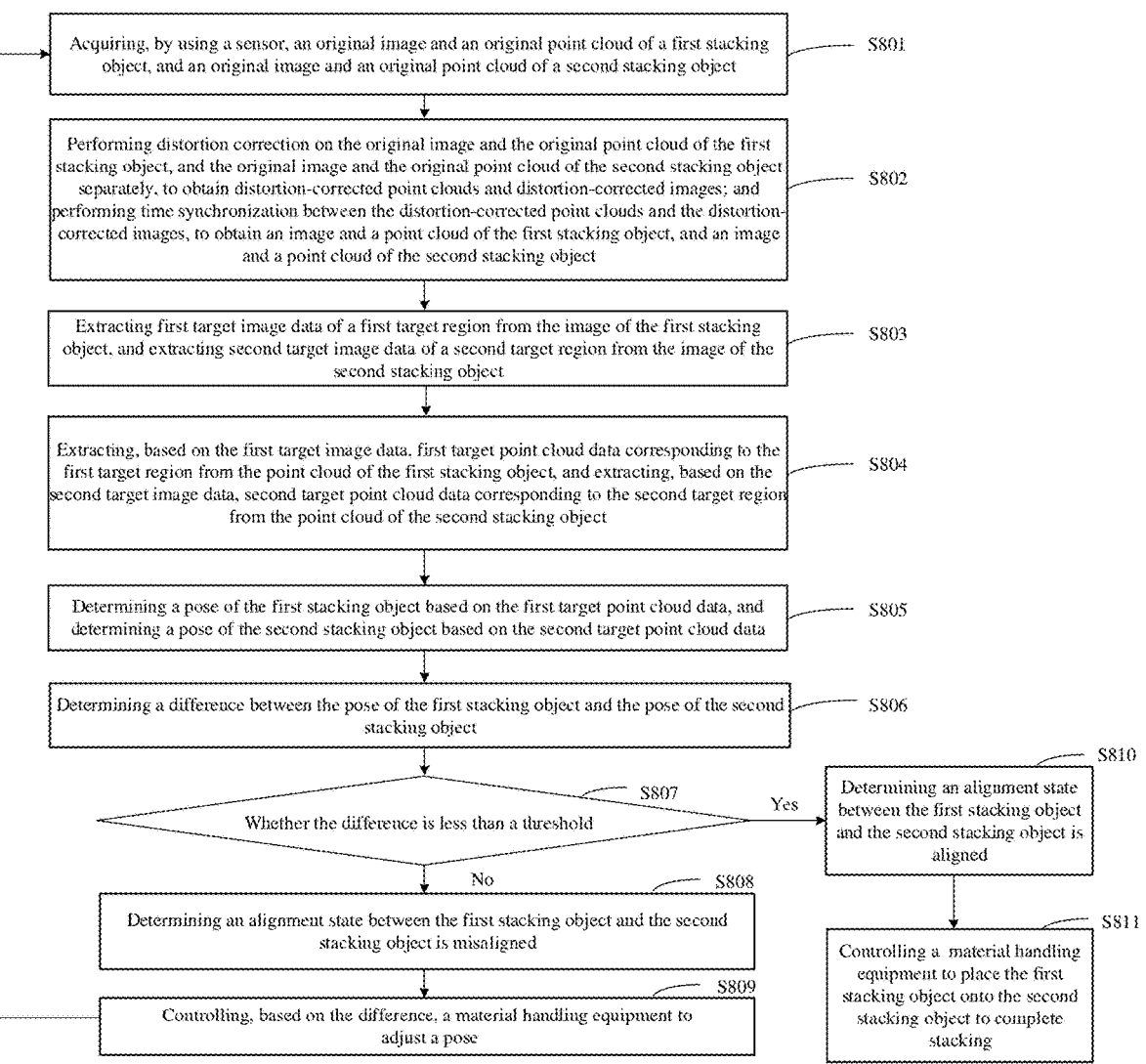
FIG. 9 is a flowchart of a method for determining an alignment state according to an embodiment of the present disclosure.

The following describes, with reference to an actual application scenario, an implementation of the method provided in the embodiment of the present disclosure. As shown in FIG. 9, an execution body is a controller in the material handling equipment, and the method includes the following steps:

Step S801: acquiring, by using the sensor, an original image and an original point cloud of the first stacking object, and an original image and an original point cloud of the second stacking object; and Step S802: performing distortion correction on the original image and the original point cloud of the first stacking object, and the original image and the original point cloud of the second stacking object separately, to obtain distortion-corrected images and distortion-corrected point clouds; and performing time synchronization between the distortion-corrected point clouds and the distortion-corrected images, to obtain the image and the point cloud of the first stacking object, and the image and the point cloud of the second stacking object, The performing distortion correction on the original image and the original point cloud of the first stacking object, and the original image and the original point cloud of the second stacking object separately includes: performing distortion correction on each of the original image of the first stacking object and the original image of the second stacking object based on a pre-calibrated camera intrinsic parameter; transforming the original point cloud of the first stacking object from a coordinate system in which the radar is located to a coordinate system in which the material handling equipment is located, and performing distortion correction on the original point cloud of the first stacking object based on odometer information and a time stamp corresponding to the original image of the first stacking object; transforming the original point cloud of the second stacking object from a coordinate system in which the radar is located to a coordinate system in which the material handling equipment is located, and performing distortion correction on the original point cloud of the second stacking object based on odometer information and a time stamp corresponding to the original image of the second stacking object; and performing time synchronization between the distortion-corrected images and the distortion-corrected point clouds, to obtain the image and the point cloud of the first stacking object, and the image and the point cloud of the second stacking object;

Step S803: extracting first target image data of a first target region from the image of the first stacking object, and extracting second target image data of a second target region from the image of the second stacking object;

Step S804: extracting, based on the first target image data, first target point cloud data corresponding to the first target region from the point cloud of the first stacking object; and extracting, based on the second target image data, second target point cloud data corresponding to the second target region from the point cloud of the second stacking object;

Step S805: determining a pose of the first stacking object based on the first target point cloud data, and determining a pose of the second stacking object based on the second target point cloud data;

Step S806: determining a difference between the pose of the first stacking object and the pose of the second stacking object;

Step S807: determining whether the difference is less than a threshold;

Step S808: when the difference is greater than or equal to the threshold, determining an alignment relationship between the first stacking object and the second stacking object is misaligned, and performing Step S809;

Step S809: controlling, based on the difference, the material handling equipment to adjust a pose, performing Step S801 to Step S807 until the difference is less than the threshold, and performing Step S810 and Step S811;

Step S810: when the difference is less than the threshold, determining the alignment state between the first stacking object and the second stacking object is aligned; and Step S811: controlling the material handling equipment to place the first stacking object onto the second stacking object to complete stacking.

Optionally, as shown in FIG. 10, in embodiments of the present disclosure, before determining the alignment state, the method further includes Step S1001: controlling material handling equipment to move the first stacking object to a stacking preparation position to complete a pre-alignment action relative to the second stacking object.

The stacking preparation position refers to a position before a stacking operation position is reached, and a pose of the second stacking object can be obtained by the material handling equipment at the position.

Pre-alignment refers to aligning the first stacking object with the second stacking object basically along the Y-axis direction by adjusting the pose of the material handling equipment. That is, a coordinate difference $\Delta Y$ along the Y-axis and a rotational angle difference $\Delta \Psi$ along the Z-axis between the first stacking object and the second stacking object are within respective preset thresholds. The thresholds may be flexibly adjusted depending on different material handling equipments and stacking objects, for example, may be: $-5$ cm$<\Delta Y<5$ cm, $-3°<\Delta \Psi<3°$.

In a pre-alignment phase, before the material handling equipment carries the first stacking object to move to the second stacking object, the material handling equipment first raises the fork to an optimal detection height, then calculates, by detecting features such as an upright of the second stacking object, an orientation of the upright, and adjusts the chassis or the fork to complete pre-alignment.

The foregoing method provided in the embodiments of the present disclosure may be applied to a plurality of application scenarios, including but not limited to an unmanned warehouse scenario and an unmanned lift truck scenario.

An unmanned warehouse may include an automated guided forklift, a storage rack, a picking station, a warehouse management system (Warehouse Management System, WMS), and the like.

The unmanned lift truck scenario includes an automated guided forklift, and a truck.

The foregoing describes specific embodiments of this specification. Other embodiments fall within the scope of the appended claims. In some cases, actions or steps recorded in the claims may be performed in an order other than those described in the embodiments, while still bringing desired results. In addition, the desired results do not require a process illustrated in the drawings to necessarily follow the shown specific order or sequential order. In some implementations, multitasking and parallel processing are also possible or may be advantageous.

According to another embodiment, a controller is provided, to perform the steps of the method in any one of the foregoing method embodiments.

Embodiments in this specification are all described in a progressive manner, for same or similar parts in embodiments, mutual reference may be made. Each embodiment focuses on what is different from other embodiments. Especially, a system embodiment or an apparatus embodiment is basically similar to a method embodiment, and therefore is described briefly; and for related parts, reference may be made to partial descriptions in the method embodiment. The system embodiment and the apparatus embodiment described above are merely an example. The units described as separate parts may be or may not be physically separate, and parts displayed as units may be or may not be physical units, that is, may be located at one position, or may be distributed on a plurality of network units. Some or all of the modules may be selected according to an actual need to achieve the objectives of the solutions of the embodiments. A person of ordinary skill in the art may understand and implement embodiments of the present disclosure without creative efforts.

In addition, an embodiment of the present disclosure further provides a computer-readable storage medium, where the computer-readable storage medium stores a computer program. When the program is executed by a controller, the steps of the method in any one of the foregoing method embodiments are implemented.

An embodiment of the present disclosure further provides material handling equipment. The material handling equipment includes: a material handling equipment body; a sensor mounted on the material handling equipment body; and one or more controllers. When a program instruction is read and executed by the one or more controllers, the steps of the method in any one of the foregoing method embodiments are performed.

In some examples, the sensor includes a camera and a radar that are jointly calibrated.

An embodiment of the present disclosure further provides a computer program product, including a computer program. When the computer program is executed by a controller, the steps of the method in any one of the foregoing method embodiments are implemented.

Based on the foregoing descriptions of the implementations, a person skilled in the art may clearly understand that the present disclosure may be implemented by software in addition to a necessary universal hardware platform. Based on such an understanding, the technical solutions in the present disclosure essentially, or the part contributing to the conventional technology may be implemented in a form of a computer program product. The computer program product may be stored in a storage medium, for example, a ROM/RAM, a magnetic disk, or an optical disc.

The technical solutions provided in the present disclosure are described above in detail. The principles and implementations of the present disclosure are described herein by using specific examples. The descriptions about embodiments of the present disclosure are merely provided to help understand the methods and core ideas of the present disclosure. In addition, a person of ordinary skill in the art can make variations to the present disclosure in terms of the specific implementations and application scopes according to the ideas of the present disclosure. Therefore, the content of this specification shall not be construed as a limitation on the present disclosure.

What is claimed is:

1. A material handling equipment, comprising a controller, wherein the controller is configured to execute a program instruction to implement the following steps:

controlling the material handling equipment to move a first stacking object to a stacking preparation position to complete a pre-alignment action relative to a second stacking object;

acquiring an image of the first stacking object and an image of the second stacking object by using a camera, and a point cloud of the first stacking object and a point cloud of the second stacking object by using a LiDAR, wherein the camera and the LiDAR are both installed on the material handling equipment;

extracting first target image data of a first target region from the image of the first stacking object, and extracting second target image data of a second target region from the image of the second stacking object;

extracting, based on the first target image data, first target point cloud data corresponding to the first target region from the point cloud of the first stacking object;

extracting, based on the second target image data, second target point cloud data corresponding to the second target region from the point cloud of the second stacking object;

determining a pose of the first stacking object based on the first target point cloud data, and determining a pose of the second stacking object based on the second target point cloud data; and determining a difference between the pose of the first stacking object and the pose of the second stacking object, and comparing the difference with a threshold to determine an alignment state between the first stacking object and the second stacking object;

wherein the extracting, based on the first target image data, the first target point cloud data corresponding to the first target region from the point cloud of the first stacking object comprises: extracting, based on a joint calibration parameter and the first target image data, the first target point cloud data corresponding to the first target region from the point cloud of the first stacking object; and the extracting, based on the second target image data, the second point cloud data corresponding to the second target region from the target point cloud of the second stacking object comprises: extracting, based on a joint calibration parameter and the second target image data, the second target point cloud data corresponding to the second target region from the point cloud of the second stacking object.

2. The material handling equipment according to claim 1, wherein the extracting the first target image data of the first target region from the image of the first stacking object, and extracting the second target image data of the second target region from the image of the second stacking object comprises:

extracting, based on an image segmentation model, the first target image data of the first target region from the image of the first stacking object, and extracting the second target image data of the second target region from the image of the second stacking object.

3. The material handling equipment according to claim 1, wherein the extracting the first target image data of the first target region from the image of the first stacking object, and extracting the second target image data of the second target region from the image of the second stacking object comprises:

extracting, based on a target detection model, the first target image data of the first target region from the image of the first stacking object, and extracting the second target image data of the second target region from the image of the second stacking object.

4. The material handling equipment according to claim 1, wherein the controller is configured to further execute the following step:

performing joint calibration on the camera acquiring images and the LiDAR acquiring point clouds, to obtain the joint calibration parameter.

5. The material handling equipment according to claim 4, wherein the joint calibration parameter comprises at least one of following:

an intrinsic parameter and an extrinsic parameter of the camera, an extrinsic parameter of the LiDAR relative to the camera, and an extrinsic parameter of the LiDAR relative to material handling equipment.

6. The material handling equipment according to claim 1, wherein the comparing the difference with the threshold to determine the alignment state between the first stacking object and the second stacking object comprises:

in a case where the difference is greater than or equal to the threshold, determining the alignment state as misaligned; and in a case where the difference is less than the threshold, determining the alignment state as aligned.

7. The material handling equipment according to claim 6, wherein the controller is configured to further execute the following steps:

when the alignment state is misaligned, controlling material handling equipment to adjust a pose;

re-acquiring by using the sensor, an image and a point cloud of the first stacking object, and an image and a point cloud of the second stacking object;

re-determining a difference between a pose of the first stacking object and a pose of the second stacking object; and re-determining the alignment state based on the difference until the difference is less than the threshold.

8. The material handling equipment according to claim 6, wherein the controller is configured to further execute the following step:

when the alignment state is aligned, controlling material handling equipment to place the first stacking object onto the second stacking object to complete stacking.

9. The material handling equipment according to claim 7, wherein the controlling the material handling equipment to adjust the pose comprises: controlling the material handling equipment to adjust a pose of a chassis or a pose of a fork.

10. The material handling equipment according to claim 7, wherein the controlling the material handling equipment to adjust the pose comprises:

determining pose adjustment information of the material handling equipment based on the alignment state;

acquiring odometer information corresponding to a target instant, wherein the target instant is an instant when the sensor acquires the image and the point cloud of the first stacking object, and the image and the point cloud of the second stacking object;

determining, based on the odometer information corresponding to the target instant, the pose adjustment information, and odometer information corresponding to a current instant, pose adjustment information corresponding to the current instant; and adjusting the pose of the material handling equipment based on the pose adjustment information corresponding to the current instant.

11. The material handling equipment according to claim 1, wherein the acquiring the image of the first stacking object, and the image of the second stacking object by using the camera, and the point cloud of the first stacking object and the point cloud of the second stacking object by using the LiDAR comprises:

acquiring an original image of the first stacking object and an original image of the second stacking object by using the camera, and acquiring an original point cloud of the first stacking object and an original point cloud of the second stacking object by using the LiDAR;

performing distortion correction on the original image of the first stacking object based on a pre-calibrated camera intrinsic parameter, and performing distortion correction on the original image of the second stacking object based on the pre-calibrated camera intrinsic parameter;

transforming the original point cloud of the first stacking object from a coordinate system of the LiDAR to a coordinate system of the material handling equipment, and performing distortion correction on the original point cloud of the first stacking object based on odometer information and a time stamp corresponding to the original image of the first stacking object;

transforming the original point cloud of the second stacking object from the coordinate system of the LiDAR to the coordinate system of the material handling equipment, and performing distortion correction on the original point cloud of the second stacking object based on odometer information and a time stamp corresponding to the original image of the second stacking object; and performing time synchronization between the distortion-corrected images and the distortion-corrected point clouds, to obtain the image and the point cloud of the first stacking object, and the image and the point cloud of the second stacking object.

12. The material handling equipment according to claim 1, wherein the determining the pose of the first stacking object based on the first target point cloud data comprises:

extracting a first border point cloud from the first target point cloud data;

performing fitting on the first border point cloud based on the least squares method to obtain a border line equation corresponding to the first stacking object; and determining the pose of the first stacking object based on the border line equation corresponding to the first stacking object.

13. The material handling equipment according to claim 1, wherein the determining the pose of the second stacking object based on the second target point cloud data comprises:

extracting a second border point cloud from the second target point cloud data;

performing fitting on the second border point cloud based on the least squares method to obtain a border line equation corresponding to the second stacking object; and determining the pose of the second stacking object based on the border line equation corresponding to the second stacking object.

14. The material handling equipment according to claim 1, wherein the first target region is located on a first side of the first stacking object, the second target region is located on a second side of the second stacking object, and the first side and the second side are a same side when the first stacking object is aligned with the second stacking object.

15. The material handling equipment according to claim 1, wherein the first stacking object is a first material cage, and the second stacking object is a second material cage;

the first target region comprises a first border line and a third border line of the first material cage, and the first border line intersects the third border line; and the second target region comprises a second border line and a fourth border line of the second material cage, and the second border line intersects the fourth border line.

16. The material handling equipment according to claim 15, wherein the first target region further comprises a fifth border line and a seventh border line of the first material cage, and the fifth border line intersects the seventh border line; and the second target region further comprises a sixth border line and an eighth border line of the second material cage, and the sixth border line intersects the eighth border line.

17. A controller, configured to execute a program instruction to implement the following steps:

controlling a material handling equipment to move a first stacking object to a stacking preparation position to complete a pre-alignment action relative to a second stacking object;

acquiring an image of the first stacking object, and an image of the second stacking object by using a camera, and a point cloud of the first stacking object and a point cloud of the second stacking object by using a LiDAR, wherein the camera and the LiDAR are both installed on the material handling equipment;

extracting first target image data of a first target region from the image of the first stacking object, and extracting second target image data of a second target region from the image of the second stacking object;

extracting, based on the first target image data, first target point cloud data corresponding to the first target region from the point cloud of the first stacking object;

extracting, based on the second target image data, second target point cloud data corresponding to the second target region from the point cloud of the second stacking object;

determining a pose of the first stacking object based on the first target point cloud data, and determining a pose of the second stacking object based on the second target point cloud data; and determining a difference between the pose of the first stacking object and the pose of the second stacking object, and comparing the difference with a threshold to determine an alignment state between the first stacking object and the second stacking object;

wherein the extracting, based on the first target image data, the first target point cloud data corresponding to the first target region from the point cloud of the first stacking object comprises: extracting, based on a joint calibration parameter and the first target image data, the first target point cloud data corresponding to the first target region from the point cloud of the first stacking object; and the extracting, based on the second target image data, the second point cloud data corresponding to the second target region from the target point cloud of the second stacking object comprises: extracting, based on a joint calibration parameter and the second target image data, the second target point cloud data corresponding to the second target region from the point cloud of the second stacking object.

18. A method for determining an alignment state, comprising:

controlling a material handling equipment to move a first stacking object to a stacking preparation position to complete a pre-alignment action relative to a second stacking object;

acquiring an image of the first stacking object; and an image of the second stacking object by using a camera, and a point cloud of the first stacking object and a point cloud of the second stacking object by using a LiDAR, wherein the camera and the LiDAR are both installed on the material handling equipment;

extracting first target image data of a first target region from the image of the first stacking object, and extracting second target image data of a second target region from the image of the second stacking object;

extracting, based on the first target image data, first target point cloud data corresponding to the first target region from the point cloud of the first stacking object;

extracting, based on the second target image data, second target point cloud data corresponding to the second target region from the point cloud of the second stacking object;

determining a pose of the first stacking object based on the first target point cloud data, and determining a pose of the second stacking object based on the second target point cloud data; and determining a difference between the pose of the first stacking object and the pose of the second stacking object, and comparing the difference with a threshold to determine an alignment state between the first stacking object and the second stacking object;

wherein the extracting, based on the first target image data, the first target point cloud data corresponding to the first target region from the point cloud of the first stacking object comprises: extracting, based on a joint calibration parameter and the first target image data, the first target point cloud data corresponding to the first target region from the point cloud of the first stacking object; and the extracting, based on the second target image data, the second point cloud data corresponding to the second target region from the target point cloud of the second stacking object comprises: extracting, based on a joint calibration parameter and the second target image data, the second target point cloud data corresponding to the second target region from the point cloud of the second stacking object.

* * * * *